United States Patent
Liang et al.

(10) Patent No.: US 11,532,978 B2
(45) Date of Patent: Dec. 20, 2022

(54) POWER CONVERSION MODULE, VEHICLE-MOUNTED CHARGER, AND ELECTRIC VEHICLE

(71) Applicant: Huawei Digital Power Technologies Co., Ltd., Shenzhen (CN)

(72) Inventors: Yongtao Liang, Shenzhen (CN); Weiping Liu, Dongguan (CN); Feng Su, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 206 days.

(21) Appl. No.: 17/139,613

(22) Filed: Dec. 31, 2020

(65) Prior Publication Data

US 2021/0122255 A1 Apr. 29, 2021

Related U.S. Application Data

(63) Continuation of application No. PCT/CN2020/084869, filed on Apr. 15, 2020.

(30) Foreign Application Priority Data

Jun. 25, 2019 (CN) .......................... 201910554830.1

(51) Int. Cl.
*B60L 53/22* (2019.01)
*H02M 1/00* (2006.01)
(Continued)

(52) U.S. Cl.
CPC ............ *H02M 1/007* (2021.05); *B60L 53/22* (2019.02); *H02M 3/01* (2021.05);
(Continued)

(58) Field of Classification Search
CPC .... H02M 1/007; H02M 3/01; H02M 3/33553; H02M 3/33573; H02M 1/4216;
(Continued)

(56) References Cited

U.S. PATENT DOCUMENTS

| | | | |
|---|---|---|---|
| 11,114,883 B2* | 9/2021 | Vela Garcia | ............ B60L 53/20 |
| 2017/0179813 A1 | 6/2017 | Fu et al. | |
| 2021/0155100 A1* | 5/2021 | Khaligh | .................. B60L 53/22 |

FOREIGN PATENT DOCUMENTS

| | | |
|---|---|---|
| CN | 105490551 A | 4/2016 |
| CN | 107134839 A | 9/2017 |

(Continued)

OTHER PUBLICATIONS

Anderson et al., "New Synergetic Control of a 20 kW Isolated Vienna Rectifier Front-End EV Battery Charger," 2019 20th Workshop on Control and Modeling for Power Electronics (COMPEL), Total 8 pages, Institute of Electrical and Electronics Engineers, New York, New York (Jun. 17-20, 2019).

*Primary Examiner* — Paul Dinh
(74) *Attorney, Agent, or Firm* — Leydig, Voit & Mayer, Ltd.

(57) ABSTRACT

A power conversion module, a vehicle-mounted charger, and an electric vehicle may be used in the field of new energy vehicles. The power conversion module includes a power factor correction PFC module and a first direct current-direct current DC-DC converter. A first primary circuit of the first DC-DC converter has a first bridge arm, a second bridge arm, a third bridge arm, and a fourth bridge arm. A first switch is disposed between the first bridge arm and an inductor at an interface of the PFC module, and a second switch is disposed between the third bridge arm and another interface of the PFC module. When the first switch and the second switch are turned on, a secondary circuit of the first DC-DC converter may implement a function of a primary circuit of a second DC-DC converter; the second bridge arm and the fourth bridge arm may implement a function of a secondary circuit of the second DC-DC converter; and the first bridge arm, the third bridge arm, the inductor of the PFC (Continued)

module, and a capacitor of the PFC module may form an inverter module, so as to implement an inverse discharging function.

17 Claims, 18 Drawing Sheets

(51) Int. Cl.
*H02M 3/335* (2006.01)
*H02M 3/00* (2006.01)

(52) U.S. Cl.
CPC ... *H02M 3/33553* (2013.01); *H02M 3/33573* (2021.05); *B60L 2210/10* (2013.01)

(58) Field of Classification Search
CPC .. H02M 3/285; H02M 3/33584; H02M 7/797; H02M 1/44; B60L 53/22; B60L 2210/10; B60L 1/006; B60L 55/00; B60L 53/20; H02J 2207/20; H02J 2310/48; H02J 3/322; H02J 7/02; H02J 7/0065; H02J 7/0068; H02J 7/022; H02J 2007/0059; Y02E 60/00; Y04S 10/126; Y02T 10/70; Y02T 10/7072; Y02T 10/72; Y02T 10/92; Y02T 90/14
USPC ...................................................... 320/140
See application file for complete search history.

(56) References Cited

FOREIGN PATENT DOCUMENTS

| CN | 107248814 A | 10/2017 |
|---|---|---|
| CN | 107310409 A | 11/2017 |
| CN | 109728624 A | 5/2019 |
| CN | 110350796 A | 10/2019 |
| JP | 2013247817 A | 12/2013 |
| WO | 2018130773 A1 | 7/2018 |

* cited by examiner

POWER CONVERSION MODULE, VEHICLE-MOUNTED CHARGER, AND ELECTRIC VEHICLE

CROSS-REFERENCE TO RELATED APPLICATIONS

This application is a continuation of International Application No. PCT/CN2020/084869, filed on Apr. 15, 2020, which claims priority to Chinese Patent Application No. 201910554830.1, filed on Jun. 25, 2019. The disclosures of the aforementioned applications are hereby incorporated by reference in their entireties.

TECHNICAL FIELD

This application relates to the field of electronics, and in particular, to a power conversion module, a vehicle-mounted charger, and an electric vehicle.

BACKGROUND

Current manners of charging a battery of an electric vehicle mainly include fast charging and slow charging. For fast charging, a direct current charging pile directly charges a battery pack. For slow charging, an alternating current (AC) is directly supplied to an electric vehicle, a vehicle-mounted charger converts the alternating current into a direct current, and then a battery pack is charged. Specifically, a power factor correction (PFC) module and a direct current-direct current converter (DC-DC) are disposed in the vehicle-mounted charger. After the PFC module converts the supplied alternating current into a direct current bus voltage, the DC-DC converter converts the direct current bus voltage into a high-voltage direct current and then charges the battery pack.

Because the battery pack configured in the electric vehicle may carry a large amount of electricity, theoretically, a large amount of electric energy carried by the battery pack may be released to supply power to another device. For example, one electric vehicle charges another electric vehicle (V2V). For another example, an electric vehicle supplies power to a household electric device such as a rice cooker (V2L), and the like. The battery pack may be alternatively used as an energy storage battery and connected to a power grid. When the power grid is in a valley state, the battery pack is charged, and when the power grid is in a peak state, the battery pack transmits electricity to the power grid (V2G), to undertake a peak clipping and valley filling function for the power grid, and the like. Because V2V, V2L, V2G, and the like have application value, many automotive enterprises have put forward a requirement that a vehicle-mounted charger may implement an inverse discharging function.

However, a PFC module in a vehicle-mounted charger provided in the prior art has a diode, and a unilateral conduction characteristic of the diode disables a bus voltage from being reversely inverted to an input port. Therefore, a solution capable of enabling a vehicle-mounted charger to perform inverse discharging is urgently needed.

SUMMARY

Embodiments of this application provide a power conversion module, a vehicle-mounted charger, and an electric vehicle, to bypass a diode in a PFC module, and couple some bridge arms in a primary circuit in a DC-DC converter to an inductor and a capacitor that are in the PFC module to form an inverter module, so as to implement an inverse discharging function.

To resolve the foregoing technical problem, the embodiments of this application provide the following technical solutions.

According to a first aspect, an embodiment of this application provides a power conversion module, which may be used in the field of new energy vehicles. The power conversion module may include a power factor correction PFC module and a first direct current-direct current DC-DC converter. Specifically, the PFC module may include a single-phase rectifier circuit, a three-phase rectifier circuit, or another multi-phase rectifier circuit, which may be specifically embodied as a Vienna rectifier circuit. The first DC-DC converter is a bidirectional isolation converter, and may be embodied as a bidirectional resonant conversion CLLC circuit. The PFC module has a first interface, a second interface, and a bus capacitor, and a first inductor is connected to the first interface; and the first interface and the second interface include a zero wire interface and a live wire interface, and it may be that the first interface is the zero wire interface and the second interface is the live wire interface, or may be that the second interface is the zero wire interface and the first interface is the live wire interface. The first DC-DC converter includes a first primary circuit and a first secondary circuit, and the first primary circuit includes a first bridge arm, a second bridge arm, a third bridge arm, and a fourth bridge arm. The power conversion module further includes a first switch, a second switch, a third switch, and a fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. When both the first switch and the second switch are in a turned-off state and both the third switch and the fourth switch are in a turned-on state, the PFC module and the first DC-DC converter are configured to perform forward charging. When both the first switch and the second switch are in a turned-on state and both the third switch and the fourth switch are in a turned-off state, the first bridge arm is coupled to the first inductor, and the third bridge arm is coupled to the second interface, to form a second DC-DC converter and an inverter module. A second primary circuit of the second DC-DC converter is the first secondary circuit of the first DC-DC converter, a second secondary circuit of the second DC-DC converter includes the second bridge arm and the fourth bridge arm, and the inverter module includes the first bridge arm, the third bridge arm, the first inductor, and the bus capacitor.

The power conversion module provided in this implementation includes the PFC module and the first DC-DC converter, which may convert an alternating current into a direct current and then charge a battery pack. The first primary circuit in the first DC-DC converter has the first bridge arm, the second bridge arm, the third bridge arm, and the fourth bridge arm. In this embodiment of this application, the first switch is disposed between the first bridge arm and the inductor at the interface of the PFC module, and the second switch is disposed between the third bridge arm and the other interface of the PFC module. When the first switch and the second switch are turned on, the secondary circuit of the first DC-DC converter can implement a function of the primary circuit of the second DC-DC converter, the second bridge arm and the fourth bridge arm can implement a function of the secondary circuit of the second DC-DC converter, and the first bridge arm, the third bridge arm, the inductor of the PFC module, and the capacitor of the PFC module can form the inverter module. In this way, a diode in the PFC module is bypassed, and a direct current output by the battery pack may be converted into an alternating current for output after passing through the second DC-DC converter and the inverter module. When the foregoing circuit is applied to a vehicle-mounted charger, an inverse discharging function of the vehicle-mounted charger can be implemented.

In a possible implementation of the first aspect, each of the first bridge arm, the second bridge arm, the third bridge arm, and the fourth bridge arm may include two switching transistors, four switching transistors, six switching transistors, or another even quantity of switching transistors. When each of the first bridge arm to the fourth bridge arm includes two switching transistors, one end of the first switch is connected between two switching transistors of the first bridge arm, and the other end of the first switch is coupled to the first inductor; one end of the second switch is connected between two switching transistors of the third bridge arm, and the other end of the second switch is coupled to the second interface; one end of the third switch is connected between the two switching transistors of the first bridge arm, and the other end of the third switch is connected between two switching transistors of the second bridge arm; and one end of the fourth switch is connected between the two switching transistors of the third bridge arm, and the other end of the fourth switch is connected between two switching transistors of the fourth bridge arm. In this implementation, specific connection manners of the first switch to the fourth switch are provided, thereby improving implementability of this solution.

In a possible implementation of the first aspect, the first switch and the third switch are a same first transfer switch, and the second switch and the fourth switch are a same second transfer switch. In this implementation, one transfer switch implements functions of two switches. This not only helps reduce circuit complexity of the power conversion module, but also further reduces a probability that the power conversion module encounters a circuit fault, because a transfer switch can be in only one state at a time, that is, the first switch and the third switch in this embodiment are not simultaneously in a turned-on state.

In a possible implementation of the first aspect, the PFC module includes a three-phase rectifier circuit. The three-phase rectifier circuit includes three live wire interfaces and a zero wire interface. When the first interface is any one of the three live wire interfaces and the second interface is the zero wire interface, the three live wire interfaces further include a third interface, where the third interface is any one of the three live wire interfaces except the first interface. The power conversion module further includes a fifth switch, where one end of the fifth switch is connected to the second interface, and the other end of the fifth switch is coupled to the second switch. When the first switch, the second switch, and the fifth switch are all in a turned-on state, the second interface bypasses the third interface and is coupled to the third bridge arm. In this implementation, when the second interface is the zero wire interface, only the fifth switch needs to be additionally disposed in the power conversion module, and the second interface may be connected to, by using the fifth switch, a branch circuit in which the third interface is located, so as to implement coupling to the third bridge arm. This not only improves implementability of this solution, but also improves utilization of an existing component in the power conversion module. Besides, in this implementation, adding another part or component is avoided as much as possible, thereby avoiding increasing circuit complexity.

In a possible implementation of the first aspect, the three-phase rectifier circuit includes three branch circuits. The three branch circuits include a first branch circuit and a second branch circuit, where the first interface is an input interface of the first branch circuit, and the third interface is an input interface of the second branch circuit. When the third switch, the fourth switch, and the fifth switch are all in a turned-on state, the second interface bypasses the third interface and is connected to the second branch circuit, to form a single-phase rectifier circuit, where the single-phase rectifier circuit and the first DC-DC converter are configured to perform forward charging. The single-phase rectifier circuit includes the first branch circuit, a third branch circuit, and the bus capacitor, where the third branch circuit includes the second interface and a component other than the third interface in the second branch circuit. In this implementation, the existing three-phase rectifier circuit is utilized to implement a function of the single-phase rectifier circuit. In this way, the power conversion module provided in this embodiment of this application can implement both three-phase input and single-phase input, thereby expanding an application scenario of this solution and improving comprehensiveness of this solution.

In a possible implementation of the first aspect, a second inductor is connected to the third interface, one end of the fifth switch is connected to the second interface, and the other end of the fifth switch may be connected between the third interface and the second inductor, or may be connected between the second inductor and the second switch. In this implementation, a connection manner of the fifth switch is provided, thereby improving executability of this solution. When the other end of the fifth switch may be connected between the third interface and the second inductor, a circuit is simple, thereby avoiding increasing circuit complexity.

In a possible implementation of the first aspect, the PFC module is a Vienna rectifier circuit, and the first DC-DC converter is a bidirectional resonant conversion CLLC circuit. The power conversion module further includes a third DC-DC converter, where the third DC-DC converter may be a unidirectional isolation conversion circuit, or may be a bidirectional isolation conversion circuit, and may be specifically embodied as a resonant conversion LLC circuit, and the third DC-DC converter includes a third primary circuit and a third secondary circuit. The first primary circuit and the first secondary circuit are connected by using a first transformer, and the third primary circuit and the third secondary circuit are connected by using a second transformer. The third primary circuit is connected to the first primary circuit in series, and the third secondary circuit is connected to the first secondary circuit in parallel. In this implementation, the third DC-DC converter may be further disposed in the power conversion module, and the primary circuits of the first DC-DC converter and the third DC-DC converter are connected in series, and the secondary circuits of the first DC-DC converter and the third DC-DC converter are connected in parallel. This helps reduce a voltage borne by each switching transistor in the first DC-DC converter and the third DC-DC converter, and not only reduces a probability that a part or component in the first DC-DC converter and the third DC-DC converter is damaged, but also increases a maximum charging power output by the power conversion module.

In a possible implementation of the first aspect, all switching transistors in the first bridge arm, the second bridge arm, the third bridge arm, and the fourth bridge arm are MOS transistors, triodes, silicon carbide SiC transistors, or insulated gate bipolar transistors IGBTs. In this implementation, specific implementations of the switching transistors included in the first bridge arm to the fourth bridge arm are provided, thereby improving executability of this solution. In addition, this helps reduce a total area of the power conversion module, makes an operation simple and easy to implement, and further helps reduce product costs.

According to a second aspect, an embodiment of this application further provides a vehicle-mounted charger, including an electromagnetic compatibility EMI filter module, a power factor correction PFC module, and a first direct current-direct current DC-DC converter. The PFC module has a first interface, a second interface, and a bus capacitor, and a first inductor is connected to the first interface. The first DC-DC converter includes a first primary circuit and a first secondary circuit, and the first primary circuit includes a first bridge arm, a second bridge arm, a third bridge arm, and a fourth bridge arm. A power conversion module further includes a first switch, a second switch, a third switch, and a fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. When both the first switch and the second switch are in a turned-off state and both the third switch and the fourth switch are in a turned-on state, the EMI filter module, the PFC module, and the first DC-DC converter are configured to perform forward charging. When both the first switch and the second switch are in a turned-on state and both the third switch and the fourth switch are in a turned-off state, the first bridge arm is coupled to the first inductor, and the third bridge arm is coupled to the second interface, to form a second DC-DC converter and an inverter module. A second primary circuit of the second DC-DC converter is the first secondary circuit of the first DC-DC converter, a second secondary circuit of the second DC-DC converter includes the second bridge arm and the fourth bridge arm, and the inverter module includes the first bridge arm, the third bridge arm, the first inductor, and the bus capacitor.

In a possible implementation of the second aspect, each of the first bridge arm, the second bridge arm, the third bridge arm, and the fourth bridge arm includes two switching transistors. One end of the first switch is connected between two switching transistors of the first bridge arm, and the other end of the first switch is coupled to the first inductor. One end of the second switch is connected between two switching transistors of the third bridge arm, and the other end of the second switch is coupled to the second interface. One end of the third switch is connected between the two switching transistors of the first bridge arm, and the other end of the third switch is connected between two switching transistors of the second bridge arm. One end of the fourth switch is connected between the two switching transistors of the third bridge arm, and the other end of the fourth switch is connected between two switching transistors of the fourth bridge arm.

In a possible implementation of the second aspect, the first switch and the third switch are a same first transfer switch, and the second switch and the fourth switch are a same second transfer switch.

In a possible implementation of the second aspect, the PFC module includes a three-phase rectifier circuit. The three-phase rectifier circuit includes three live wire interfaces and a zero wire interface. The first interface is any one of the three live wire interfaces, the second interface is the zero wire interface, and the three live wire interfaces further include a third interface, where the third interface is any one of the three live wire interfaces except the first interface. The power conversion module further includes a fifth switch, where one end of the fifth switch is connected to the second interface, and the other end of the fifth switch is coupled to the second switch. When the first switch, the second switch, and the fifth switch are all in a turned-on state, the second interface bypasses the third interface and is coupled to the third bridge arm.

In a possible implementation of the second aspect, the three-phase rectifier circuit includes a first branch circuit and a second branch circuit, where the first interface is an input interface of the first branch circuit, and the third interface is an input interface of the second branch circuit. When the third switch, the fourth switch, and the fifth switch are all in a turned-on state, the second interface bypasses the third interface and is connected to the second branch circuit, to form a single-phase rectifier circuit. The single-phase rectifier circuit includes the first branch circuit, a third branch circuit, and the bus capacitor, where the third branch circuit includes the second interface and a component other than the third interface in the second branch circuit.

In a possible implementation of the second aspect, a second inductor is connected to the third interface, one end of the fifth switch is connected to the second interface, and the other end of the fifth switch is connected between the third interface and the second inductor.

In a possible implementation of the second aspect, the PFC module is a Vienna rectifier circuit, and the first DC-DC converter is a CLLC circuit. The power conversion module further includes a third DC-DC converter, where the third DC-DC converter is an LLC circuit, and the third DC-DC converter includes a third primary circuit and a third secondary circuit. The third primary circuit is connected to the first primary circuit in series, and the third secondary circuit is connected to the first secondary circuit in parallel.

In a possible implementation of the second aspect, all switching transistors in the first bridge arm, the second bridge arm, the third bridge arm, and the fourth bridge arm are MOS transistors, triodes, silicon carbide SiC transistors, or insulated gate bipolar transistors IGBTs.

For specific implementations and beneficial effects of components included in an electronic assembly provided in the second aspect of this application, refer to the first aspect. Details are not described herein again.

According to a third aspect, an embodiment of this application further provides an electric vehicle, including a vehicle-mounted charger and a battery pack. The vehicle-mounted charger includes an electromagnetic compatibility EMI filter module, a power factor correction PFC module, and a first direct current-direct current DC-DC converter. The PFC module has a first interface, a second interface, and a bus capacitor, and a first inductor is connected to the first interface. The first DC-DC converter includes a first primary circuit and a first secondary circuit, and the first primary circuit includes a first bridge arm, a second bridge arm, a third bridge arm, and a fourth bridge arm. A power conversion module further includes a first switch, a second switch, a third switch, and a fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. When both the first switch and the second switch are in a turned-off state and both the third switch and the fourth switch are in a turned-on state, the EMI filter module, the PFC module, and the first DC-DC converter are configured to perform forward charging. When both the first switch and the second switch are in a turned-on state and both the third switch and the fourth switch are in a turned-off state, the first bridge arm is coupled to the first inductor, and the third bridge arm is coupled to the second interface, to form a second DC-DC converter and an inverter module. A second primary circuit of the second DC-DC converter is the first secondary circuit of the first DC-DC converter, a second secondary circuit of the second DC-DC converter includes the second bridge arm and the fourth bridge arm, and the inverter module includes the first bridge arm, the third bridge arm, the first inductor, and the bus capacitor.

In a possible implementation of the third aspect, each of the first bridge arm, the second bridge arm, the third bridge arm, and the fourth bridge arm includes two switching transistors. One end of the first switch is connected between two switching transistors of the first bridge arm, and the other end of the first switch is coupled to the first inductor. One end of the second switch is connected between two switching transistors of the third bridge arm, and the other end of the second switch is coupled to the second interface. One end of the third switch is connected between the two switching transistors of the first bridge arm, and the other end of the third switch is connected between two switching transistors of the second bridge arm. One end of the fourth switch is connected between the two switching transistors of the third bridge arm, and the other end of the fourth switch is connected between two switching transistors of the fourth bridge arm.

In a possible implementation of the third aspect, the first switch and the third switch are a same first transfer switch, and the second switch and the fourth switch are a same second transfer switch.

In a possible implementation of the third aspect, the PFC module includes a three-phase rectifier circuit. The three-phase rectifier circuit includes three live wire interfaces and a zero wire interface. The first interface is any one of the three live wire interfaces, the second interface is the zero wire interface, and the three live wire interfaces further include a third interface, where the third interface is any one of the three live wire interfaces except the first interface. The power conversion module further includes a fifth switch, where one end of the fifth switch is connected to the second interface, and the other end of the fifth switch is coupled to the second switch. When the first switch, the second switch, and the fifth switch are all in a turned-on state, the second interface bypasses the third interface and is coupled to the third bridge arm.

In a possible implementation of the third aspect, the three-phase rectifier circuit includes a first branch circuit and a second branch circuit, where the first interface is an input interface of the first branch circuit, and the third interface is an input interface of the second branch circuit. When the third switch, the fourth switch, and the fifth switch are all in a turned-on state, the second interface bypasses the third interface and is connected to the second branch circuit, to form a single-phase rectifier circuit. The single-phase rectifier circuit includes the first branch circuit, a third branch circuit, and the bus capacitor, where the third branch circuit includes the second interface and a component other than the third interface in the second branch circuit.

In a possible implementation of the third aspect, a second inductor is connected to the third interface, one end of the fifth switch is connected to the second interface, and the other end of the fifth switch is connected between the third interface and the second inductor.

In a possible implementation of the third aspect, the PFC module is a Vienna rectifier circuit, and the first DC-DC converter is a CLLC circuit. The power conversion module further includes a third DC-DC converter, where the third DC-DC converter is an LLC circuit, and the third DC-DC converter includes a third primary circuit and a third secondary circuit. The third primary circuit is connected to the first primary circuit in series, and the third secondary circuit is connected to the first secondary circuit in parallel.

In a possible implementation of the third aspect, all switching transistors in the first bridge arm, the second bridge arm, the third bridge arm, and the fourth bridge arm are MOS transistors, triodes, silicon carbide SiC transistors, or insulated gate bipolar transistors IGBTs.

For specific implementations and beneficial effects of components of an electronic assembly included in a communications device provided in the third aspect of this application, refer to the first aspect. Details are not described herein again.

DESCRIPTION OF EMBODIMENTS

The embodiments of this application provide a power conversion module, a vehicle-mounted charger, and an electric vehicle, to bypass a diode in a PFC module, and couple some bridge arms in a primary circuit in a DC-DC converter to an inductor and a capacitor that are in the PFC module to form an inverter module, so as to implement an inverse discharging function.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following further describes this application in detail with reference to the accompanying drawings in the embodiments of this application. The described embodiments are merely some but not all of the embodiments of the present invention. The power conversion module provided in the embodiments of this application may be applied to a charger disposed in a machine device. The machine device may be an electric vehicle, a large-sized machine tool, or another machine device with a built-in charger. It may be understood that in the embodiments of this application, only an example is used for description in which the power conversion module is applied to an electric vehicle.

Figure 1:
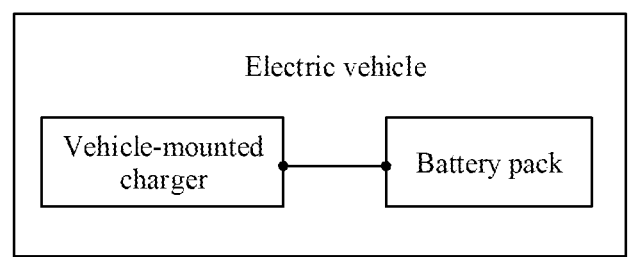
FIG. 1 is a schematic structural diagram of an electric vehicle according to an embodiment of this application.
Figure 2:
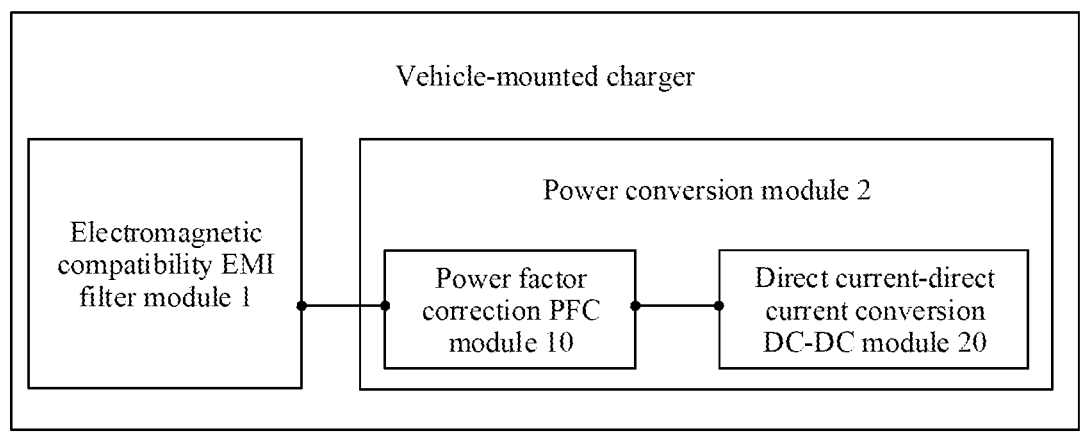
FIG. 2 is a schematic structural diagram of a vehicle-mounted charger according to an embodiment of this application.

FIG. 1 is a schematic structural diagram of an electric vehicle according to an embodiment of this application. The electric vehicle includes at least a vehicle-mounted charger and a battery pack. Specifically, refer to FIG. 2. FIG. 2 is a schematic structural diagram of a vehicle-mounted charger according to an embodiment of this application. The vehicle-mounted charger may include an electromagnetic compatibility (electromagnetic compatibility, EMI) filter module 1 and a power conversion module 2. The power conversion module 2 includes a PFC module 10 and a DC-DC conversion module 20. More specifically, the EMI filter module 1 may also be referred to as a "power supply EMI filter module", and is configured to perform a filter operation on a frequency point of a specific frequency or a frequency other than the frequency point in a power supply, so as to obtain a power signal at a specific frequency or a power signal with a specific frequency filtered out; the PFC module 10 in the power conversion module 2 is configured to convert a power alternating current on which the filter operation has been performed into a bus direct current; and the isolation DC-DC conversion module 20 in the power conversion module 2 is configured to convert the bus direct current into a high-voltage direct current and then charge the battery pack.

To enable the vehicle-mounted charger to not only have a charging function but also implement an inverse discharging function, an embodiment of this application provides a power conversion module 2. The power conversion module 2 may be applied to the vehicle-mounted charger shown in FIG. 2. FIG. 3 to FIG. 7 separately show three different schematic structural diagrams of a power conversion module according to an embodiment of this application. In FIG. 3 to FIG. 7, each of the power conversion modules 2 includes a PFC module 10 and a first DC-DC converter 200. That is, a DC-DC conversion module 20 includes the first DC-DC converter 200. Specifically, the PFC module 10 may include a rectifier circuit and a PFC circuit. The rectifier circuit is configured to convert an input alternating current into a bus direct current, and may be specifically embodied as a single-phase rectifier circuit, a three-phase rectifier circuit, another multi-phase rectifier circuit, or the like. The PFC circuit corresponds to the rectifier circuit, and is configured to improve a power factor of the rectifier circuit. When the rectifier circuit is a three-phase rectifier circuit, the PFC module 10 may be embodied as a Vienna (vienna) rectifier circuit, a three-phase six-switch rectifier circuit, three single-phase rectifier circuits connected in parallel, or the like. When the rectifier circuit is a single-phase rectifier circuit, the PFC module 10 may be alternatively embodied as another circuit, or the like. A specific embodiment form of the PFC module 10 is not limited herein. The first DC-DC converter 200 is a bidirectional isolation converter, is configured to perform isolation conversion on the bus direct current to obtain a direct current that can charge a battery pack, and may be specifically embodied as a bidirectional resonant conversion (capacitor-inductor-inductor-capacitor, CLLC) circuit, a bidirectional active full-bridge (DAB) circuit, another type of bidirectional isolation DC-DC converter, or the like. This is not limited herein. It may be understood that in this embodiment, only an example is used for description in which the PFC module 10 is embodied as a Vienna (vienna) rectifier circuit and the first DC-DC converter 200 is embodied as a CLLC circuit. When another type of rectifier circuit and another type of PFC circuit are selected for the PFC module 10, or when another type of isolation conversion circuit is selected for the first DC-DC converter 200, refer to the solutions provided in this embodiment, and details are not described herein.

In this embodiment of this application, the PFC module 10 has a first interface, a second interface, and a bus capacitor, and a first inductor is connected to the first interface. The first DC-DC converter 200 includes a first primary circuit and a first secondary circuit, and the first primary circuit includes a first bridge arm, a second bridge arm, a third bridge arm, and a fourth bridge arm. The power conversion module 2 further includes a first switch, a second switch, a third switch, and a fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. When both the first switch and the second switch are in a turned-off state and both the third switch and the fourth switch are in a turned-on state, the PFC module 10 and the first DC-DC converter 200 are configured to perform forward charging. When both the first switch and the second switch are in a turned-on state and both the third switch and the fourth switch are in a turned-off state, the first bridge arm is coupled to the first inductor, and the third bridge arm is coupled to the second interface, to form a second DC-DC converter 40 and an inverter module 50. A second primary circuit of the second DC-DC converter 40 is the first secondary circuit of the first DC-DC converter 200, a second secondary circuit of the second DC-DC converter 40 includes the second bridge arm and the fourth bridge arm, and the inverter module 50 includes the first bridge arm, the third bridge arm, the first inductor, and the bus capacitor.

Figure 3:
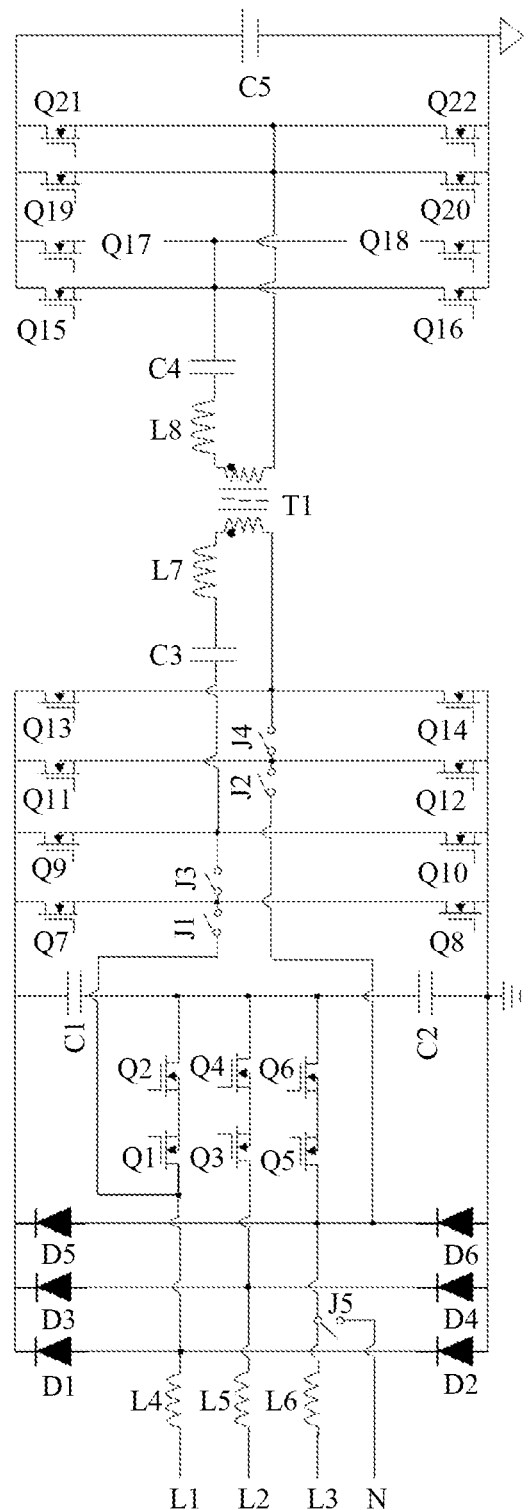
FIG. 3 is a schematic structural diagram of a power conversion module according to an embodiment of this application.

Specifically, in an example in FIG. 3, a PFC module 10 includes three branch circuits, one zero wire interface N, and bus capacitors. Each branch circuit has one live wire interface, and the three live wire interfaces in the three branch circuits are L1, L2, and L3, separately. An inductor may be connected to each live wire interface, where an inductor L4 is connected to the live wire interface L1, an inductor L5 is connected to the live wire interface L2, and an inductor L6 is connected to the live wire interface L3. It may be understood that although one inductor is connected to each live wire interface in the example in FIG. 3, a quantity of inductors is not limited in this embodiment of this application. Two or more inductors may be alternatively connected to each live wire interface, and a specific quantity of inductors may be determined with reference to an actual product status. Each branch circuit may further include a diode and a switching transistor. Specifically, with reference to FIG. 3, first, the branch circuit in which the live wire interface L1 is located is used as an example for description. The branch circuit in which the live wire interface L1 is located may further include a diode D1, a diode D2, a switching transistor Q1, and a switching transistor Q2. Polarities of the diode D1 and the diode D2 are opposite. When the diode D1 is conducted, the diode D2 is cut off, and when the diode D1 is cut off, the diode D2 is conducted. As an example, for example, it may be that the diode D1 is a PNP-type diode, and the diode D2 is an NPN-type diode, or that the diode D1 is an NPN-type diode, and the diode D2 is a PNP-type diode, or the like. Although one diode D1 and one diode D2 are shown in FIG. 3, a quantity of diodes is not limited in this embodiment of this application. When the PFC module 10 is configured to perform forward charging, the switching transistor Q1 and the switching transistor Q2 may be simultaneously turned on or simultaneously turned off. Because being turned-on or turned-off of the switching transistor Q1 and the switching transistor Q2 may be controlled by using an external control circuit, a polarity relationship between the switching transistor Q1 and the switching transistor Q2 is not limited in this embodiment of this application. Both the switching transistor Q1 and the switching transistor Q2 may be embodied as a triode, a silicon carbide (silicon carbide, SiC) transistor, an insulated gate bipolar transistor (insulated gate bipolar transistor, IGBT), or a metal-oxygen-semiconductor field-effect transistor (metal-oxide-semiconductor, MOS), which may also be referred to as a "MOS transistor" for short. It may be understood that although one switching transistor Q1 and one switching transistor Q2 are shown in FIG. 3, there may alternatively be three or more switching transistors, and this is not specifically limited herein.

Correspondingly, the branch circuit in which the live wire interface L2 is located may further include a diode D3, a diode D4, a switching transistor Q3, and a switching transistor Q4, and the branch circuit in which the live wire interface L3 is located may further include a diode D5, a diode D6, a switching transistor Q5, and a switching transistor Q6. Polarities of the diode D3 and the diode D4 are opposite, and polarities of the diode D5 and the diode D6 are opposite. Polarities of the diode D3 and the diode D5 may be the same as the polarity of the diode D1, and polarities of the diode D4 and the diode D6 may be the same as the polarity of the diode D2. In a case in which a power conversion module is configured to perform three-phase charging, when the diode D1 is conducted, the diode D3 and the diode D5 are conducted, and the diode D2, the diode D4, and the diode D6 are cut off; and when the diode D1 is cut off, the diode D3 and the diode D5 are cut off, and the diode D2, the diode D4, and the diode D6 are conducted. Specific embodiment forms of the diode D3 and the diode D5 may be similar to a specific embodiment form of the diode D1, and specific embodiment forms of the diode D4 and the diode D6 may be similar to a specific embodiment form of the diode D2. Herein, the specific embodiment forms of the diode D3, the diode D5, the diode D4, and the diode D6 are not described. It may be understood that quantities of the diodes D3, the diodes D5, the diodes D4, and the diodes D6 are not limited either in this embodiment of this application.

In this embodiment of this application, a polarity relationship between the switching transistor Q3 and the switching transistor Q4 and a polarity relationship between the switching transistor Q5 and the switching transistor Q6 are not limited either. When the power conversion module is configured to perform three-phase charging, the switching transistor Q1 and the switching transistor Q2 may be simultaneously turned on or simultaneously turned off, the switching transistor Q3 and the switching transistor Q4 may be simultaneously turned on or simultaneously turned off, and the switching transistor Q5 and the switching transistor Q6 may be simultaneously turned on or simultaneously turned off. For specific embodiment forms of the switching transistor Q3, the switching transistor Q4, the switching transistor Q5, and the switching transistor Q6, refer to descriptions of the switching transistor Q1 and the switching transistor Q2. No more examples are provided herein either. It may be understood that quantities of the switching transistors Q3, the switching transistors Q4, the switching transistors Q5, and the switching transistors Q6 are not limited either in this embodiment of this application.

The bus capacitor is a capacitor disposed on a bus, and specifically, may be one capacitor, or may be at least two capacitors. In FIG. 3, an example is used for description in which there are two bus capacitors, namely, a capacitor C1 and a capacitor C2.

Further, the diode D1 is connected to the capacitor C1 in series, the diode D2 is connected to the capacitor C2 in series, and the switching transistor Q1 and the switching transistor Q2 are connected in series. The diode D1 and the capacitor C1, the diode D2 and the capacitor C2, and the switching transistor Q1 and the switching transistor Q2 are connected to each other in parallel. One side of the diode D1 and the capacitor C1, the diode D2 and the capacitor C2, and the switching transistor Q1 and the switching transistor Q2 that are connected in parallel is connected to the inductor L4 and the live wire interface L1, and the other side of the diode D1 and the capacitor C1, the diode D2 and the capacitor C2, and the switching transistor Q1 and the switching transistor Q2 that are connected in parallel may be connected to the zero wire interface N by using the bus.

Correspondingly, the diode D3 is connected to the capacitor C1 in series, the diode D4 is connected to the capacitor C2 in series, and the switching transistor Q3 and the switching transistor Q4 are connected in series. The diode D3 and the capacitor C1, the diode D4 and the capacitor C2, and the switching transistor Q3 and the switching transistor Q4 are connected to each other in parallel. One side of the diode D3 and the capacitor C1, the diode D4 and the capacitor C2, and the switching transistor Q3 and the switching transistor Q4 that are connected in parallel is connected to the inductor L5 and the live wire interface L2, and the other side of the diode D3 and the capacitor C1, the diode D4 and the capacitor C2, and the switching transistor Q3 and the switching transistor Q4 that are connected in parallel may be connected to the zero wire interface N through the bus.

The diode D5 is connected to the capacitor C1 in series, the diode D6 is connected to the capacitor C2 in series, and the switching transistor Q5 and the switching transistor Q6 are connected in series. The diode D5 and the capacitor C1, the diode D6 and the capacitor C2, and the switching transistor Q5 and the switching transistor Q6 are connected to each other in parallel. One side of the diode D5 and the capacitor C1, the diode D6 and the capacitor C2, and the switching transistor Q5 and the switching transistor Q6 that are connected in parallel is connected to the inductor L6 and the live wire interface L3, and the other side of the diode D5 and the capacitor C1, the diode D6 and the capacitor C2, and the switching transistor Q5 and the switching transistor Q6 that are connected in parallel may be connected to the zero wire interface N through the bus.

Next, the following describes the first DC-DC converter 200. The first DC-DC converter 200 may include a first primary circuit, a first secondary circuit, and a transformer T1, where the first primary circuit and the first secondary circuit are connected by using the transformer T1. The first primary circuit may include a first bridge arm, a second bridge arm, a third bridge arm, a fourth bridge arm, a capacitor C3, and an inductor L7. It may be understood that although four bridge arms are shown in the first primary circuit in FIG. 3, in an actual product, the first primary circuit may alternatively include six bridge arms, eight bridge arms, or the like, provided that the first primary circuit includes at least four bridge arms. A specific quantity of bridge arms may be flexibly determined with reference to an actual requirement, and is not limited herein. Each of the four bridge arms in the first secondary circuit may include two symmetrically disposed switching transistors, and the four bridge arms specifically include a switching transistor Q7, a switching transistor Q8, a switching transistor Q9, a switching transistor Q10, a switching transistor Q11, a switching transistor Q12, a switching transistor Q13, and a switching transistor Q14. It may be understood that although each bridge arm in the example in FIG. 3 includes two symmetrically disposed switching transistors, in an actual product, each bridge arm may alternatively include four symmetrically disposed switching transistors, six symmetrically disposed switching transistors, or the like. Herein, a quantity of switching transistors in each bridge arm included in the first primary circuit is not limited. Specifically, the switching transistor Q7, the switching transistor Q8, the switching transistor Q9, the switching transistor Q10, the switching transistor Q11, the switching transistor Q12, the switching transistor Q13, and the switching transistor Q14 may all be embodied as a triode, a MOS transistor, a SiC transistor, an IGBT, another type of switching transistor, or the like. This is not limited herein. In the foregoing manner, specific implementations of the switching transistor Q7 to the switching transistor Q14 are provided, thereby improving executability of this solution. In addition, this helps reduce a total area of the power conversion module 2, makes an operation simple and easy to implement, and further helps reduce product costs.

The switching transistor Q7 and the switching transistor Q9 are connected in parallel, the switching transistor Q12 and the switching transistor Q14 are connected in parallel, the switching transistor Q8 and the switching transistor Q10 are connected in parallel, and the switching transistor Q11 and the switching transistor Q13 are connected in parallel. Being turned-on or turned-off of each of the switching transistor Q7, the switching transistor Q8, the switching transistor Q9, the switching transistor Q10, the switching transistor Q11, the switching transistor Q12, the switching transistor Q13, and the switching transistor Q14 may be implemented by using an external control circuit. When the power conversion module is configured to perform forward charging, the switching transistor Q7, the switching transistor Q9, the switching transistor Q12, and the switching transistor Q14 may be simultaneously turned on or simultaneously turned off, and the switching transistor Q8, the switching transistor Q10, the switching transistor Q11, and the switching transistor Q13 may be simultaneously turned on or simultaneously turned off. Specifically, when the switching transistor Q7, the switching transistor Q9, the switching transistor Q12, and the switching transistor Q14 are turned on, the switching transistor Q8, the switching transistor Q10, the switching transistor Q11, and the switching transistor Q13 are turned off; and when the switching transistor Q7, the switching transistor Q9, the switching transistor Q12, and the switching transistor Q14 are turned off, the switching transistor Q8, the switching transistor Q10, the switching transistor Q11, and the switching transistor Q13 are turned on.

More specifically, when the switching transistor Q7, the switching transistor Q9, the switching transistor Q12, and the switching transistor Q14 are turned on, the capacitor C3, the inductor L7, and the transformer T1 are connected in series before the switching transistor Q7 and the switching transistor Q9 that are connected in parallel and the switching transistor Q12 and the switching transistor Q14 that are connected in parallel; and when the switching transistor Q8, the switching transistor Q10, the switching transistor Q11, and the switching transistor Q13 are turned on, the capacitor C3, the inductor L7, and the transformer T1 are connected in series between the switching transistor Q8 and the switching transistor Q10 that are connected in parallel and the switching transistor Q11 and the switching transistor Q13 that are connected in parallel.

The first secondary circuit may also include four bridge arms, a capacitor C4, and an inductor L8. Each of the four bridge arms included in the first secondary circuit may include two switching transistors. The eight switching transistors included in the four bridge arms are a switching transistor Q15, a switching transistor Q16, a switching transistor Q17, a switching transistor Q18, a switching transistor Q19, a switching transistor Q20, a switching transistor Q21, and a switching transistor Q22. For specific embodiment forms of the switching transistor Q15 to the switching transistor Q22, refer to the foregoing descriptions of the switching transistor Q7 to the switching transistor Q13, and details are not described herein again. Similar to the first primary circuit, the first secondary circuit may include two bridge arms, six bridge arms, eight bridge arms, another quantity of bridge arms, or the like, provided that the first secondary circuit includes at least two bridge arms. A specific quantity of bridge arms included in the first secondary circuit is not limited herein. In addition, each bridge arm may alternatively include four switching transistors, six switching transistors, or the like. A quantity of switching transistors in each bridge arm included in the first secondary circuit is not limited herein.

The switching transistor Q15 and the switching transistor Q17 are connected in parallel, the switching transistor Q19 and the switching transistor Q21 are connected in parallel, the switching transistor Q16 and the switching transistor Q18 are connected in parallel, and the switching transistor Q20 and the switching transistor Q22 are connected in parallel. Being turned-on or turned-off of each of the switching transistor Q15 to the switching transistor Q22 may be implemented by using an external control circuit. When the power conversion module is configured to perform forward charging, the switching transistor Q15, the switching transistor Q17, the switching transistor Q19, and the switching transistor Q21 may be simultaneously turned on or simultaneously turned off, and the switching transistor Q16, the switching transistor Q18, the switching transistor Q20, and the switching transistor Q22 may be simultaneously turned on or simultaneously turned off. Specifically, when the switching transistor Q15, the switching transistor Q17, the switching transistor Q19, and the switching transistor Q21 are turned on, the switching transistor Q16, the switching transistor Q18, the switching transistor Q20, and the switching transistor Q22 are turned off; and when the switching transistor Q15, the switching transistor Q17, the switching transistor Q19, and the switching transistor Q21 are turned off, the switching transistor Q16, the switching transistor Q18, the switching transistor Q20, and the switching transistor Q22 are turned on.

More specifically, when the switching transistor Q15, the switching transistor Q17, the switching transistor Q19, and the switching transistor Q21 are turned on, the capacitor C4, the inductor L8, and the transformer T1 are connected in series before the switching transistor Q15 and the switching transistor Q17 that are connected in parallel and the switching transistor Q19 and the switching transistor Q21 that are connected in parallel; and when the switching transistor Q16, the switching transistor Q18, the switching transistor Q20, and the switching transistor Q22 are turned on, the capacitor C4, the inductor L8, and the transformer T1 are connected in series between the switching transistor Q16 and the switching transistor Q18 that are connected in parallel and the switching transistor Q20 and the switching transistor Q22 that are connected in parallel.

In this embodiment of this application, the power conversion module may further include the first switch, the second switch, the third switch, and the fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. The first interface and the second interface include a live wire interface and a zero wire interface, and the first inductor is connected to the first interface. It may be that the first inductor is connected to the zero wire interface, that is, the first interface is the zero wire interface, or may be that the first inductor is connected to the live wire interface, that is, the first interface is the live wire interface. FIG. 3 to FIG. 9 separately show a plurality of connection manners of the first switch and the second switch when the first interface is the live wire interface and when the first interface is the zero wire interface.

First, refer to FIG. 3 to FIG. 7. In each of FIG. 3 to FIG. 7, an example is used for description in which the first interface is the live wire interface and the second interface is the zero wire interface. The first interface may be any one of the three live wire interfaces L1, L2, and L3. In FIG. 3 to FIG. 7, only an example is used for description in which the first interface is the L1 live wire interface. In addition, in each of FIG. 3 to FIG. 7, an example is used for description in which a first switch is a switch J1, a second switch is a switch J2, a third switch is a switch J3, a fourth switch is a switch J4, and a fifth switch is a switch J5; and correspondingly, the first bridge arm is a bridge arm including the switching transistor Q7 and the switching transistor Q8, the second bridge arm is a bridge arm including the switching transistor Q9 and the switching transistor Q10, the third bridge arm is a bridge arm including the switching transistor Q11 and the switching transistor Q12, and the fourth bridge arm is a bridge arm including the switching transistor Q13 and the switching transistor Q14.

Specifically, referring to FIG. 3 to FIG. 7, one end of the third switch (that is, a switch J3 in FIG. 3 and FIG. 6) is connected to a conducting wire between the switching transistor Q7 and the switching transistor Q8, and the other end of the third switch is connected to a conducting wire between the switching transistor Q9 and the switching transistor Q10; and correspondingly, one end of the fourth switch (that is, a switch J4 in FIG. 3 and FIG. 6) is connected to a conducting wire between the switching transistor Q11 and the switching transistor Q12, and the other end of the fourth switch is connected to a conducting wire between the switching transistor Q13 and the switching transistor Q14. The first switch (that is, a switch J1 in FIG. 3 and FIG. 6) is disposed between the first bridge arm and a first inductor. Specifically, one end of the first switch may be connected between the switching transistor Q7 and the switching transistor Q8, and the other end of the first switch may be coupled to the first inductor. In one case, as shown in FIG. 3, the other end of the first switch may be directly connected to the first inductor; in another case, the other end of the first switch may be alternatively connected between the switching transistor Q1 and the switching transistor Q2, and then be connected to the first inductor through the switching transistor Q1; and the like. Herein, a manner in which the other end of the first switch is coupled to the first inductor is not limited.

In this embodiment, the three live wire interfaces L1, L2, and L3 may further include a third interface, where the third interface is any one of the three live wire interfaces L1, L2, and L3 except the first interface. A second inductor 106 is connected to the third interface. In FIG. 3, an example is used for description in which the third interface is the live wire interface L3 and the second inductor 106 is the inductor L6. The power conversion module may further include the fifth switch (that is, a switch J5 in FIG. 3 and FIG. 6). One end of the fifth switch is connected to the second interface, and the other end of the fifth switch is coupled to the second switch 22. In this case, when the fifth switch is in a turned-on state, the second interface (that is, the zero wire interface N) may bypass the third interface (that is, the live wire interface L3) and be connected to the branch circuit in which the live wire interface L3 is located, to implement coupling between the second interface and the third bridge arm. In the foregoing manner, when the second interface is the zero wire interface, only the fifth switch needs to be additionally disposed in the power conversion module 2, and the second interface may be connected to, by using the fifth switch, the branch circuit in which the third interface is located, so as to implement coupling to the third bridge arm. This not only improves implementability of this solution, but also improves utilization of an existing component in the power conversion module. Besides, in the implementation solution provided in this embodiment, adding another part or component is avoided as much as possible, thereby avoiding increasing circuit complexity.

In this case, the second switch is disposed between the third bridge arm and the second interface. A specific implementation circuit may be that one end of the second switch is connected between the switching transistor Q11 and the switching transistor Q12, and the other end of the second switch is coupled to the second interface. In one case, as shown in FIG. 3, the other end of the second switch may be directly connected to the second interface through the fifth switch; in another case, one end of the second switch may be connected between the switching transistor Q5 and the switching transistor Q6, and then be connected to the second interface through the switching transistor Q5 and the fifth switch; and the like. Herein, a manner in which the other end of the second switch is coupled to the second interface is not limited either. In the foregoing manner, specific connection manners of the first switch to the fourth switch are provided, thereby improving implementability of this solution.

Figure 4:
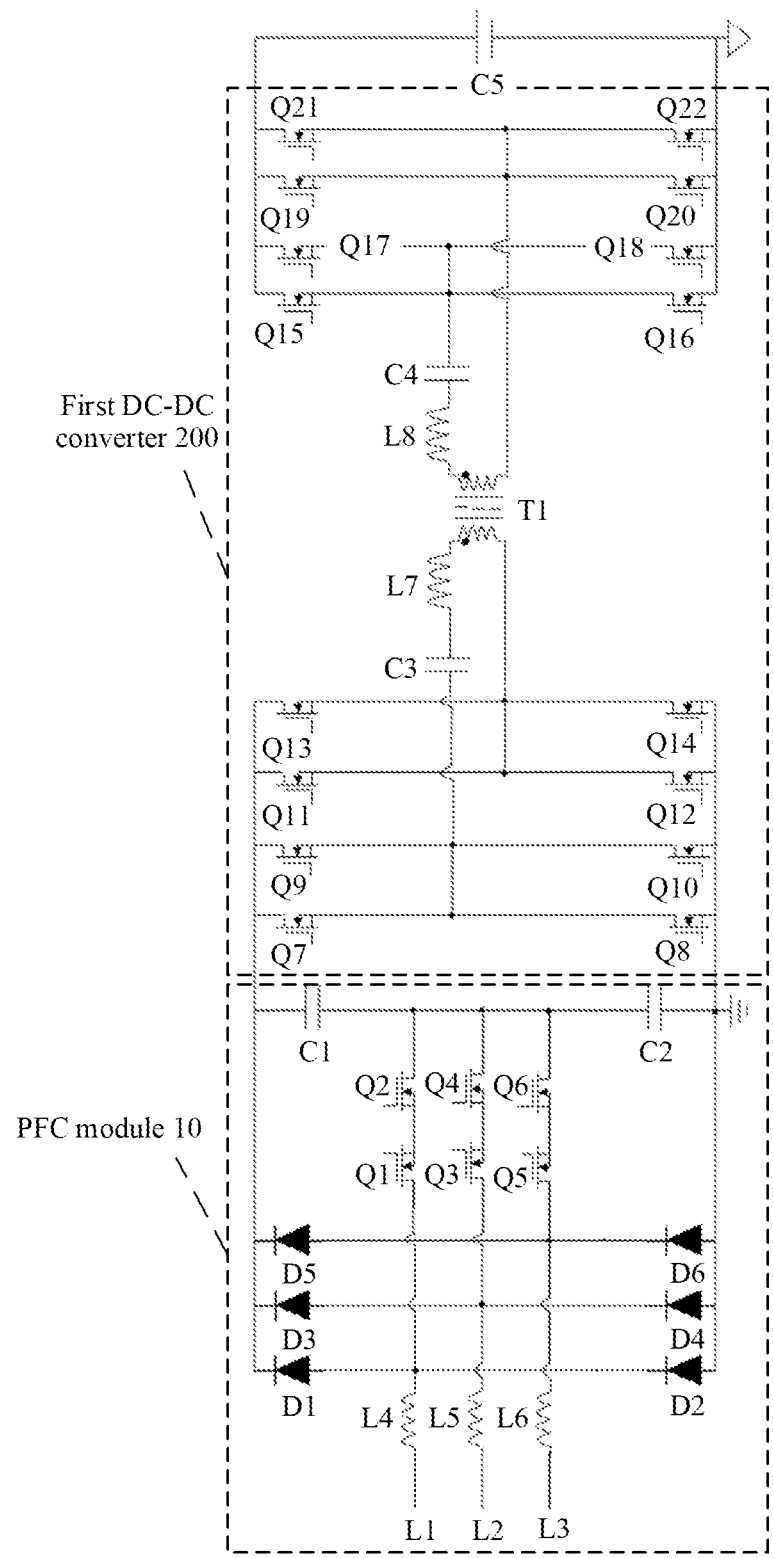
FIG. 4 is a schematic diagram of an equivalent circuit of a power conversion module according to an embodiment of this application.
Figure 6:
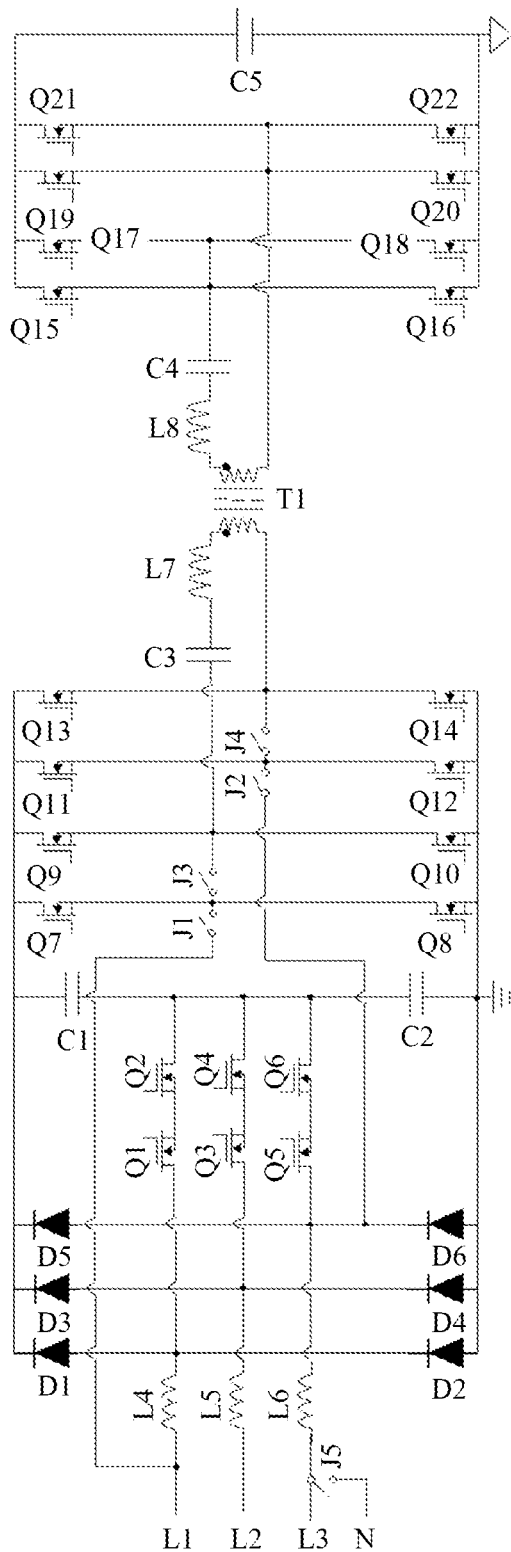
FIG. 6 is another schematic structural diagram of a power conversion module according to an embodiment of this application.

Specifically, FIG. 3 and FIG. 6 separately show two connection manners of the fifth switch. In an implementation, first, referring to FIG. 3, one end of the fifth switch is connected to the second interface, and the other end of the fifth switch is connected to a conducting wire between the second inductor 106 and the switching transistor Q5. More specifically, when the first switch, the second switch, and the fifth switch are all in a turned-off state, and both the third switch and the fourth switch are in a turned-on state, the PFC module 10 and the first DC-DC converter 200 are configured to perform forward charging. An equivalent circuit diagram of FIG. 3 may be FIG. 4. FIG. 4 is a schematic diagram of a state of a power conversion module according to an embodiment of this application. The PFC module 10 is configured to convert an input alternating current into a bus direct current voltage. Then, the first DC-DC converter performs isolation conversion on the bus direct current voltage to output a stable direct current voltage, and charges a battery pack C5. It should be noted that although the zero wire interface N is not shown in FIG. 3, the PFC module 10 in FIG. 3 also includes the zero wire interface N. When the PFC module 10 and the first DC-DC converter 200 are configured to perform forward charging by using a Vienna rectifier circuit, the zero wire interface N is coupled to the bus.

Figure 5:
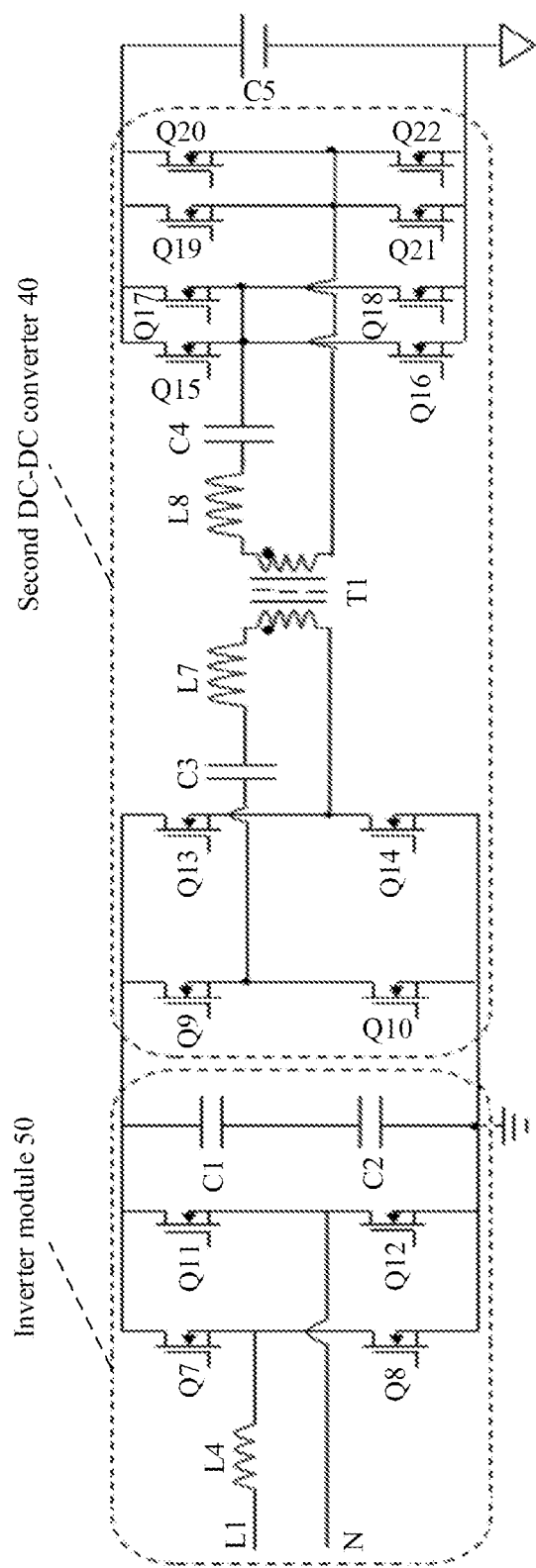
FIG. 5 is a schematic diagram of another equivalent circuit of a power conversion module according to an embodiment of this application.

When the first switch, the second switch, and the fifth switch are all in a turned-on state, and both the third switch and the fourth switch are in a turned-off state, the first bridge arm is coupled to the first inductor, and the third bridge arm is coupled to the second interface, to form a second DC-DC converter 40 and an inverter module 50. Specifically, an equivalent circuit diagram of FIG. 3 may be FIG. 5. FIG. 5 is a schematic diagram of another state of a power conversion module according to an embodiment of this application. The second DC-DC converter 40 includes a second primary circuit and a second secondary circuit. The second primary circuit is implemented by using the first secondary circuit of the first DC-DC converter 200. For an understanding of components included in the second primary circuit and connection relationships between the components, refer to the foregoing description of the first secondary circuit, and details are not described herein again. The second secondary circuit may include the second bridge arm, the fourth bridge arm, the capacitor C3, and the inductor L6. The second bridge arm includes the switching transistor Q9 and the switching transistor Q10, and the fourth bridge arm includes the switching transistor Q13 and the switching transistor Q14. Being turned-on or turned-off of each of the switching transistor Q9, the switching transistor Q10, the switching transistor Q13, and the switching transistor Q14 may be implemented by using an external control circuit. When the battery pack C5 performs inverse discharging, the switching transistor Q9 and the switching transistor Q14 are simultaneously turned on or simultaneously turned off, and the switching transistor Q10 and the switching transistor Q13 are simultaneously turned on or simultaneously turned off. More specifically, when the switching transistor Q9 and the switching transistor Q14 are turned on, the switching transistor Q10 and the switching transistor Q13 are turned off, and the switching transistor Q9, the capacitor C3, the inductor L6, and the switching transistor Q14 are connected in series; and when the switching transistor Q9 and the switching transistor Q14 are turned off, the switching transistor Q10 and the switching transistor Q13 are turned on, and the switching transistor Q10, the capacitor C3, the inductor L6, and the switching transistor Q13 are connected in series.

The inverter module 50 includes the first bridge arm, the third bridge arm, the first inductor, and the bus capacitors (the capacitor C1 and the capacitor C2 in an example in FIG. 5). The first bridge arm includes the switching transistor Q7 and the switching transistor Q8, and the third bridge arm includes the switching transistor Q11 and the switching transistor Q12. Being turned-on or turned-off of each of the switching transistor Q7, the switching transistor Q8, the switching transistor Q11, and the switching transistor Q12 may be implemented by using an external control circuit. The switching transistor Q7 and the switching transistor Q12 may be simultaneously turned on or simultaneously turned off, and the switching transistor Q8 and the switching transistor Q11 may be simultaneously turned on or simultaneously turned off. More specifically, when the switching transistor Q7 and the switching transistor Q12 are turned on, the switching transistor Q8 and the switching transistor Q11 are turned off, and the switching transistor Q7, the switching transistor Q12, the bus capacitors, and the first inductor (the inductor L4 in the example in FIG. 5) are connected in series; and when the switching transistor Q7 and the switching transistor Q12 are turned off, the switching transistor Q8 and the switching transistor Q11 are turned on, and the switching transistor Q8, the switching transistor Q11, the bus capacitors, and the first inductor are connected in series.

Further, when the first switch, the second switch, and the fifth switch are all in a turned-on state, and both the third switch and the fourth switch are in a turned-off state, that is, when the battery pack C5 performs inverse discharging, to implement that a circuit in FIG. 3 is equivalent to the capacitor in FIG. 5, the zero wire interface N needs to be disconnected from the bus. In addition, in FIG. 3, an example is used for description in which the first interface is the live wire interface L1 and the third interface is the live wire interface L3. Therefore, to prevent the branch circuit in which the live wire interface L2 is located from causing an adverse impact on the inverter module 20, both the switching transistor Q3 and the switching transistor Q4 need to be in a turned-off state. In addition, the switching transistor Q1 and/or the switching transistor Q2 may be in a turned-off state, and the switching transistor Q5 and/or the switching transistor Q6 may be in a turned-off state.

Still further, still referring to FIG. 5, when the battery pack C5 performs inverse discharging, the second DC-DC converter 40 is configured to receive a direct current voltage input by the battery pack C5, perform isolation conversion to convert the direct current voltage into a bus direct current voltage, and output the bus direct current voltage to the inverter module 50. The inverter module 50 then converts the bus direct current voltage into an alternating current voltage and outputs the alternating current voltage by using the live wire interface L1 (that is, the first interface) and the zero wire interface N (that is, the second interface). When the power conversion module is applied to a vehicle-mounted charger, the vehicle-mounted charger can implement an inverse discharging function.

In another implementation, referring to FIG. 6, one end of the fifth switch is connected to the second interface, and the other end of the fifth switch is connected to a conducting wire between the third interface and the second inductor 106. A connection manner of the fifth switch provided in this solution features a simple circuit, thereby avoiding increasing circuit complexity. Specifically, when the first switch, the second switch, and the fifth switch are all in a turned-off state, and both the third switch and the fourth switch are in a turned-on state, the PFC module 10 and the first DC-DC converter 200 are configured to perform forward charging. An equivalent circuit diagram of FIG. 6 is still FIG. 5. For a specific implementation, refer to the foregoing description of FIG. 5, and details are not described herein again.

Figure 7:
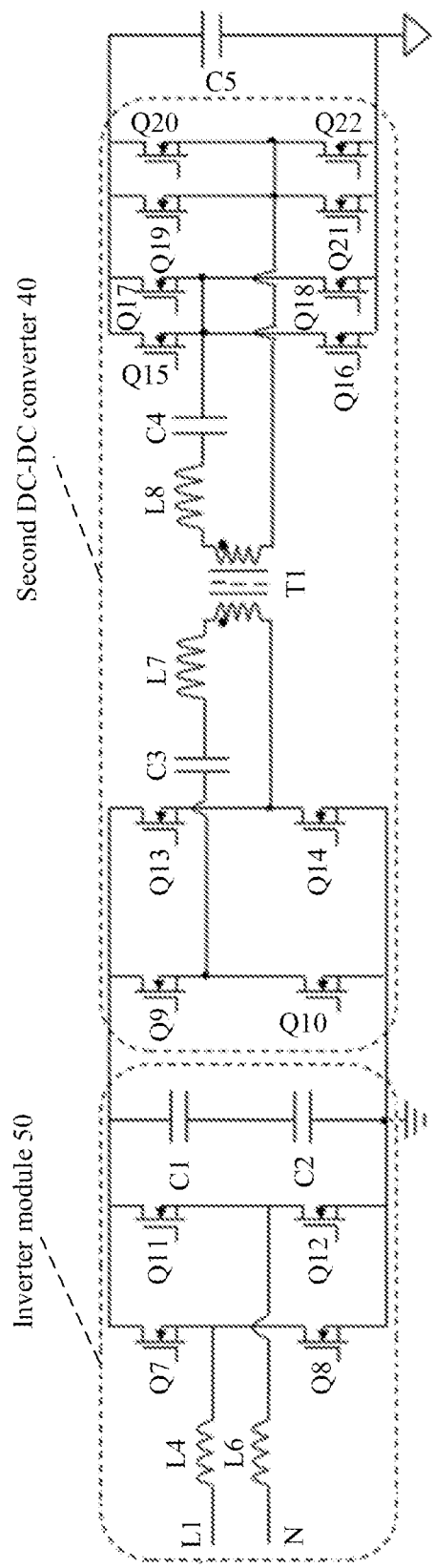
FIG. 7 is a schematic diagram of still another equivalent circuit of a power conversion module according to an embodiment of this application.

When the first switch, the second switch, and the fifth switch are all in a turned-on state, and both the third switch and the fourth switch are in a turned-off state, an equivalent circuit diagram of FIG. 6 may be FIG. 7. FIG. 7 is a schematic diagram of another state of a power conversion module according to an embodiment of this application. Similar to the second DC-DC converter 40 in FIG. 5, a second DC-DC converter 40 in FIG. 7 includes a second primary circuit and a second secondary circuit. The second primary circuit is also implemented by using the first secondary circuit of the first DC-DC converter 200, and the second secondary circuit shown in FIG. 7 is also similar to the second secondary circuit shown in FIG. 5. For details, refer to the foregoing description of FIG. 5, and details are not described herein again.

Different from the inverter module 50 in FIG. 5, an inverter module 50 shown in FIG. 7 further includes the second inductor 106, in addition to the first bridge arm, the third bridge arm, the first inductor, and the bus capacitors (the capacitor C1 and the capacitor C2 in an example in FIG. 7). When the switching transistor Q7 and the switching transistor Q12 are turned on, the switching transistor Q8 and the switching transistor Q11 are turned off, and the switching transistor Q7, the switching transistor Q12, the bus capacitors, the first inductor (the inductor L4 in the example in FIG. 7), and the second inductor 106 (the inductor L6 in the example in FIG. 7) are connected in series. When the switching transistor Q7 and the switching transistor Q12 are turned off, the switching transistor Q8 and the switching transistor Q11 are turned on, and the switching transistor Q8, the switching transistor Q11, the bus capacitors, the first inductor, and the second inductor 106 are connected in series.

In another implementation, when one end of the second switch J2 is connected between the switching transistor Q5 and the switching transistor Q6, it may be alternatively that one end of the fifth switch is connected to the second interface, and the other end of the fifth switch may be connected to a conducting wire between the switching transistor Q5 and the switching transistor Q6, or the like. In each implementation, it can be implemented that when the first switch, the second switch, and the fifth switch are in a turned-on state, the second interface bypasses the third interface and is coupled to the third bridge arm, so as to form the second DC-DC converter 40 and the inverter module 50. Herein, other implementations are not described one by one.

Figure 8:
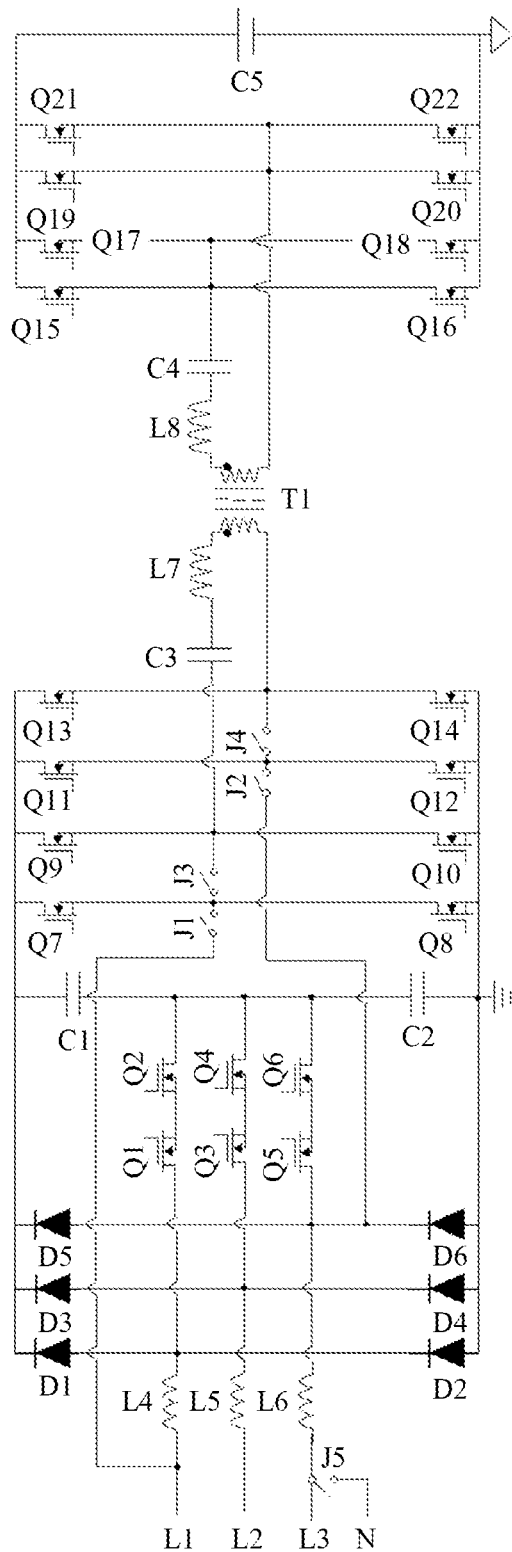
FIG. 8 is still another schematic structural diagram of a power conversion module according to an embodiment of this application.
Figure 9:
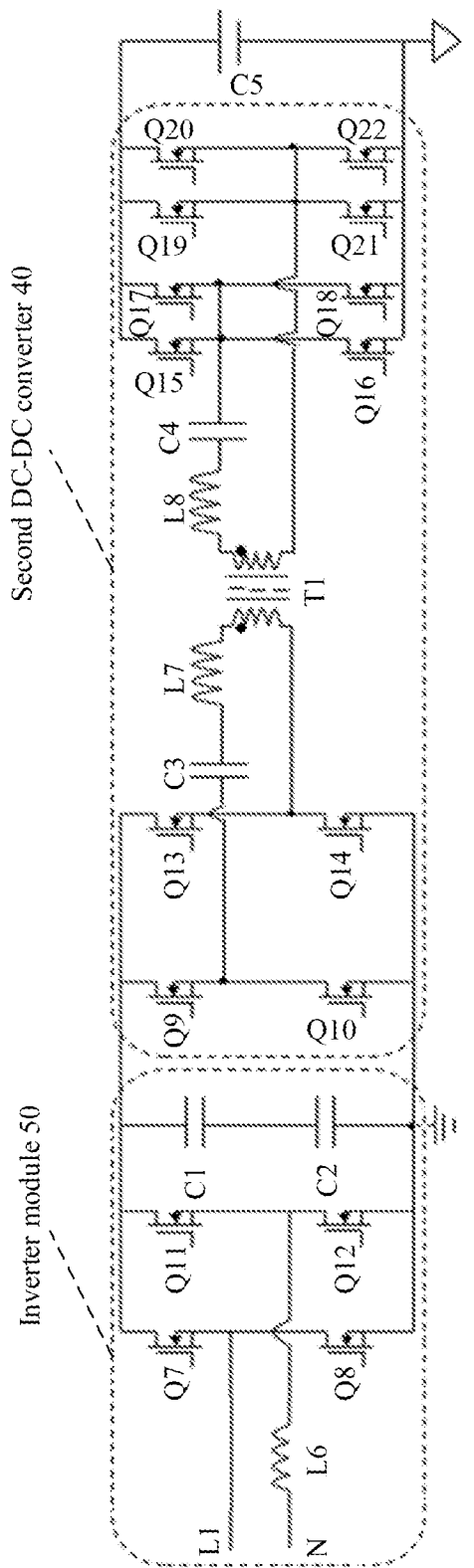
FIG. 9 is a schematic diagram of yet another equivalent circuit of a power conversion module according to an embodiment of this application.

Then, refer to FIG. 8 and FIG. 9. In FIG. 8 and FIG. 9, an example is used for description in which the first interface is the zero wire interface and the second interface is the live wire interface. The second interface may be any one of the three live wire interfaces L1, L2, and L3. The three live wire interfaces L1, L2, and L3 may further include a third interface, where the inductor L6 is connected to the third interface, and the third interface is any one of the three live wire interfaces L1, L2, and L3 except the second interface. In FIG. 8 and FIG. 9, only an example is used for description in which the first interface is the zero wire interface N, the second interface is the live wire interface L1, and the third interface is the live wire interface L3. In addition, similar to the power conversion module in the embodiment shown in FIG. 3 to FIG. 7, a power conversion module in this embodiment may further include a fifth switch. One end of the fifth switch is connected to the first interface (that is, the zero wire interface N in FIG. 8), and the other end of the fifth switch is connected to a conducting wire between the third interface (that is, the live wire interface L3 in FIG. 8) and the inductor L6, to implement that a first inductor (that is, the inductor L6 in FIG. 8) is connected to the first interface.

In FIG. 8 and FIG. 9, an example is used for description in which a first switch is a switch J2, a second switch is a switch J1, a third switch is a switch J4, a fourth switch is a switch J3, and the fifth switch is a switch J5; and correspondingly, the first bridge arm is a bridge arm including the switching transistor Q11 and the switching transistor Q12, the second bridge arm is a bridge arm including the switching transistor Q13 and the switching transistor Q14, the third bridge arm is a bridge arm including the switching transistor Q7 and the switching transistor Q8, and the fourth bridge arm is a bridge arm including the switching transistor Q9 and the switching transistor Q10. Specifically, one end of the third switch (that is, a switch J4 in FIG. 8) is connected to a conducting wire between the switching transistor Q11 and the switching transistor Q12, and the other end of the third switch is connected to a conducting wire between the switching transistor Q13 and the switching transistor Q14; and correspondingly, one end of the fourth switch (that is, a switch J3 in FIG. 8) is connected to a conducting wire between the switching transistor Q7 and the switching transistor Q8, and the other end of the fourth switch is connected to a conducting wire between the switching transistor Q9 and the switching transistor Q10.

An implementation circuit in which the first switch is disposed between the first bridge arm and the first inductor may be that one end of the first switch (that is, a switch J2 in FIG. 8) is connected between the switching transistor Q11 and the switching transistor Q12, and the other end of the first switch is coupled to the first inductor. Specifically, in one case, as shown in FIG. 8, the other end of the first switch may be directly connected to the first inductor; in another case, the other end of the first switch may be alternatively connected to a conducting wire between the switching transistor Q5 and the switching transistor Q6, and in this case, the first switch is coupled to the first inductor by using the switching transistor Q5. An implementation circuit in which the second switch (that is, a switch J1 in FIG. 8) is disposed between the third bridge arm and the second interface may be that one end of the second switch is connected to a conducting wire between the switching transistor Q7 and the switching transistor Q8, and the other end of the second switch is coupled to the second interface. Specifically, in an implementation, as shown in FIG. 8, the other end of the second switch may be directly connected to the second interface. More specifically, when the first switch, the second switch, and the fifth switch are all in a turned-off state, and both the third switch and the fourth switch are in a turned-on state, the PFC module 10 and the first DC-DC converter 200 are configured to perform forward charging. An equivalent circuit diagram of FIG. 8 is similar to the equivalent circuit diagram of FIG. 3. For details, refer to the foregoing description of FIG. 4, and details are not described herein again. When the first switch, the second switch, and the fifth switch are all in a turned-on state, and both the third switch and the fourth switch are in a turned-off state, the first bridge arm is coupled to the first inductor, and the third bridge arm is coupled to the second interface, to form a second DC-DC converter 40 and an inverter module 50. An equivalent circuit diagram of FIG. 8 may be FIG. 9. FIG. 9 is a schematic diagram of still another state of a power conversion module according to an embodiment of this application. Similar to the second DC-DC converter 40 in FIG. 5, a second DC-DC converter 40 in FIG. 9 includes a second primary circuit and a second secondary circuit. The second primary circuit is also implemented by using the first secondary circuit of the first DC-DC converter 200, and the second secondary circuit shown in FIG. 9 is also similar to the second secondary circuit shown in FIG. 5. For details, refer to the foregoing description of FIG. 5, and details are not described herein again.

Different from the inverter module 50 in FIG. 5, a first inductor included in an inverter module 50 shown in FIG. 9 is the inductor L6 connected to the zero wire interface N. When the switching transistor Q7 and the switching transistor Q12 are turned on, the switching transistor Q8 and the switching transistor Q11 are turned off, and the switching transistor Q7, the switching transistor Q12, the bus capacitors, and the first inductor (the inductor L6 in an example in FIG. 9) are connected in series. When the switching transistor Q7 and the switching transistor Q12 are turned off, the switching transistor Q8 and the switching transistor Q11 are turned on, and the switching transistor Q8, the switching transistor Q11, the bus capacitors, the first inductor, and the second inductor 106 are connected in series.

In another implementation, one end of the second switch is connected to a conducting wire between the switching transistor Q7 and the switching transistor Q8, and the other end of the second switch may be connected to a conducting wire between the inductor L4 and the switching transistor Q1. In still another implementation, the other end of the second switch may be connected to a conducting wire between the switching transistor Q1 and the switching transistor Q2. Equivalent circuit diagrams in the foregoing two implementations are similar to FIG. 4 and FIG. 7, respectively. Therefore, working principles in the foregoing two connection manners are not described herein again.

Figure 10:
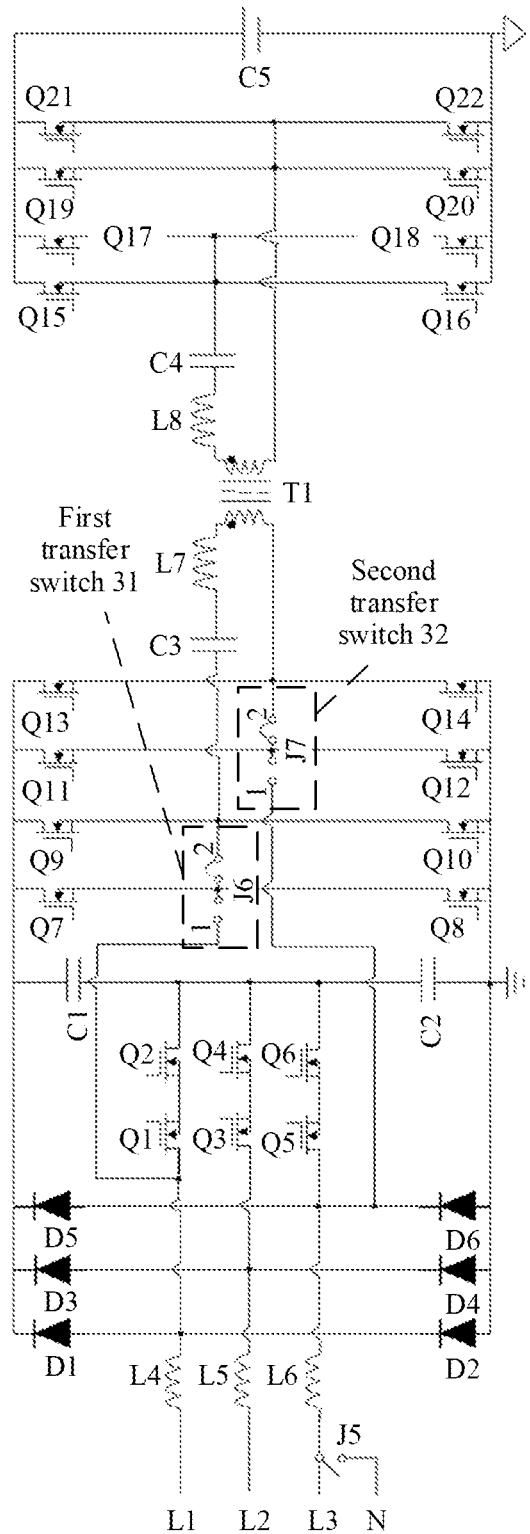
FIG. 10 is yet another schematic structural diagram of a power conversion module according to an embodiment of this application.

In addition, in a case, the first switch, the second switch, the third switch, and the fourth switch may be four independent switches. In another case, refer to FIG. 10. FIG. 10 is still another schematic structural diagram of a bilateral control apparatus according to an embodiment of this application. The first switch and the third switch may be a same first transfer switch 31 (that is, a transfer switch J6 in FIG. 10), and the second switch and the fourth switch are a same second transfer switch 32 (that is, a transfer switch J7 in FIG. 10). When both the first transfer switch 31 and the second transfer switch 32 are in a first state, that is, when each of the transfer switch J6 and the transfer switch J7 is switched to a contact 1, the first switch and the second switch are turned on, and the third switch and the fourth switch are turned off. When both the first transfer switch 31 and the second transfer switch 32 are in a second state, that is, when each of the transfer switch J6 and the transfer switch J7 is switched to a contact 2, the first switch and the second switch are turned off, and the third switch and the fourth switch are turned on. One transfer switch implements functions of two switches. This not only helps reduce circuit complexity of the power conversion module, but also further reduces a probability that the power conversion module encounters a circuit fault, because a transfer switch can be in only one state at a time, that is, the first switch and the third switch in this embodiment are not simultaneously in a turned-on state. It may be understood that FIG. 10 shows only that the first switch and the third switch in FIG. 6 are replaced with the first transfer switch 31, and the second switch and the fourth switch in FIG. 6 are replaced with the second transfer switch 32, and the switches in FIG. 3 and FIG. 8 can also be correspondingly replaced. Details are not described herein. In still another case, the first switch, the second switch, the third switch, and the fourth switch may be alternatively embodied as one switch, where the one switch includes two channels that are configured to implement being turned-on or being turned-off of the first switch, the second switch, the third switch, or the fourth switch, or the like. In this embodiment of this application, examples of the foregoing switches are merely used to facilitate understanding of this solution, and are not used to limit this solution.

Optionally, the DC-DC conversion module 20 may further include a third DC-DC converter 210. The third DC-DC converter 210 may be a unidirectional isolation converter, for example, a resonant conversion (inductor-inductor-capacitor, LLC) circuit. The third DC-DC converter 210 may alternatively be a bidirectional isolation converter, for example, a CLLC circuit. The third DC-DC converter 210 may include a third primary circuit, a third secondary circuit, and a transformer T2. The third primary circuit and the third secondary circuit are connected by using the transformer T2. The third primary circuit is connected to the first primary circuit in series, and the third secondary circuit is connected to the first secondary circuit in parallel. In this embodiment of this application, the third DC-DC converter 210 may be further disposed in the power conversion module 2, and the primary circuits of the first DC-DC converter 200 and the third DC-DC converter 210 are connected in series, and the secondary circuits of the first DC-DC converter 200 and the third DC-DC converter 210 are connected in parallel. This helps reduce a voltage borne by each switching transistor in the first DC-DC converter 200 and the third DC-DC converter 210, and not only reduces a probability that a part or component in the first DC-DC converter 200 and the third DC-DC converter 210 is damaged, but also increases a maximum charging power output by the power conversion module.

Figure 11:
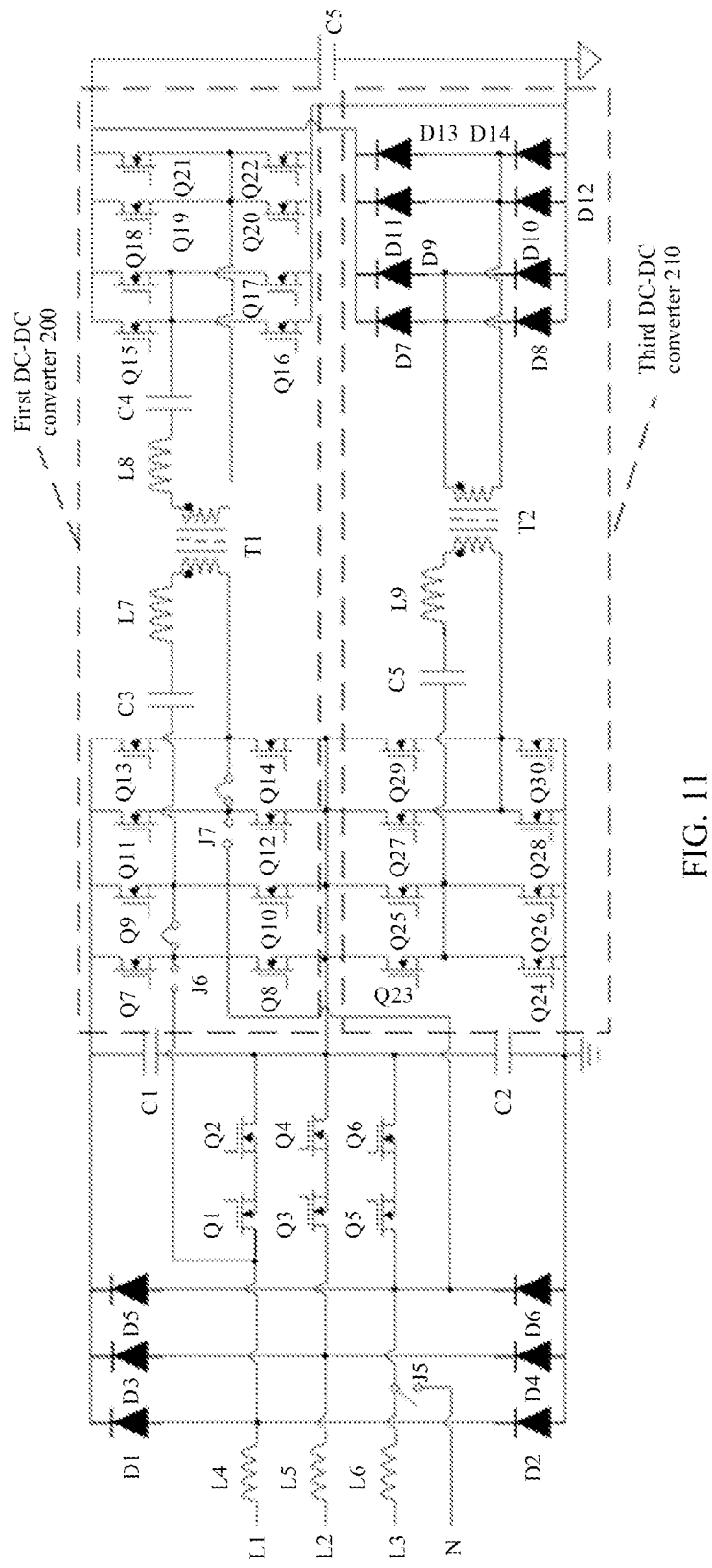
FIG. 11 is still another schematic structural diagram of a power conversion module according to an embodiment of this application.
Figure 13:
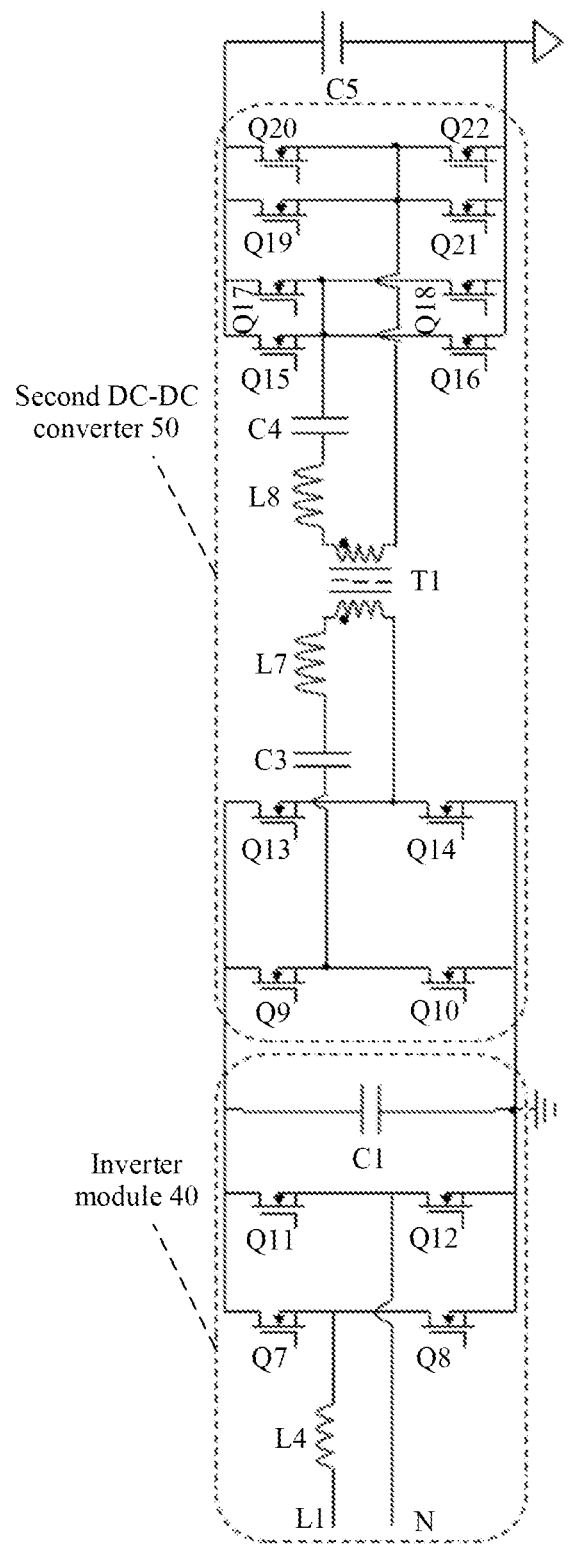
FIG. 13 is a schematic diagram of still another equivalent circuit of a power conversion module according to an embodiment of this application.
Figure 14:
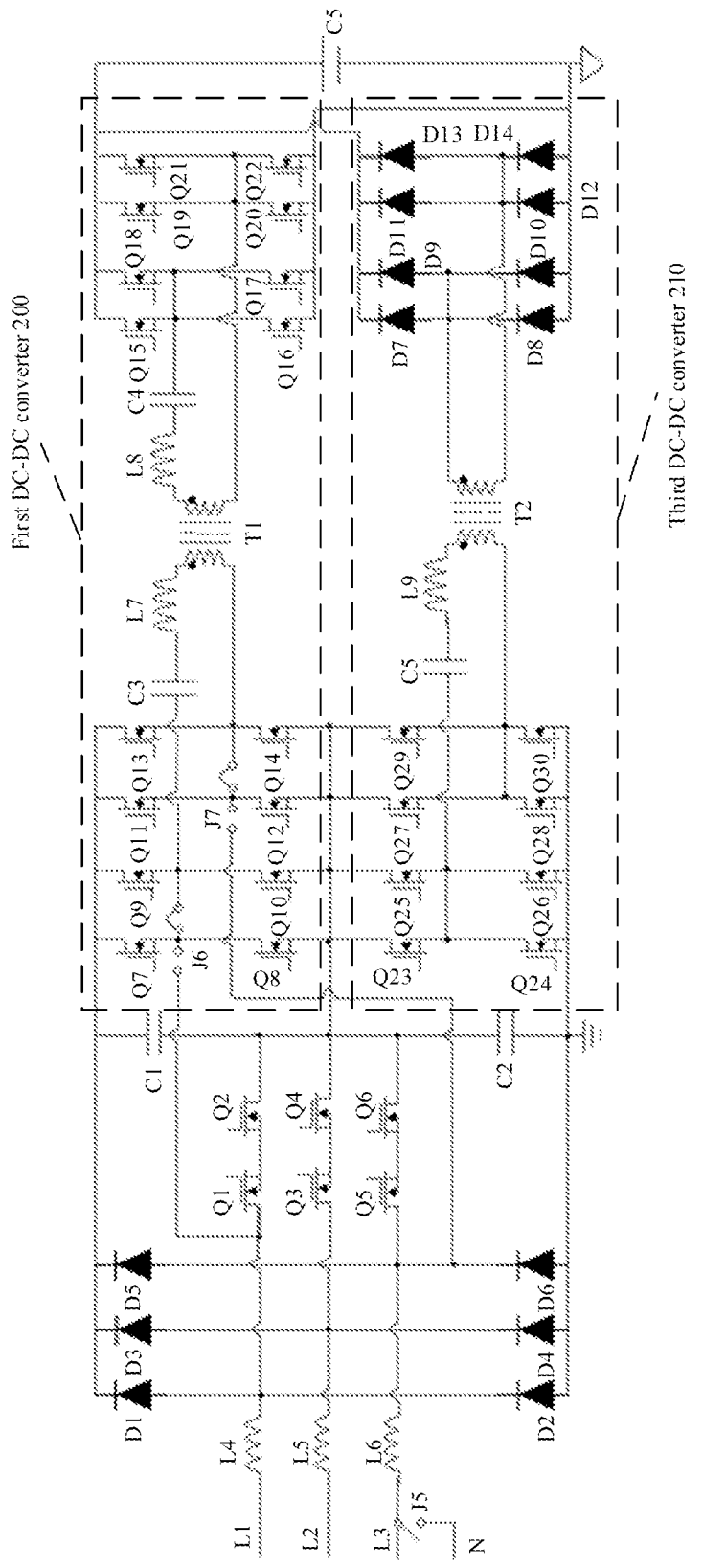
FIG. 14 is still another schematic structural diagram of a power conversion module according to an embodiment of this application.
Figure 15:
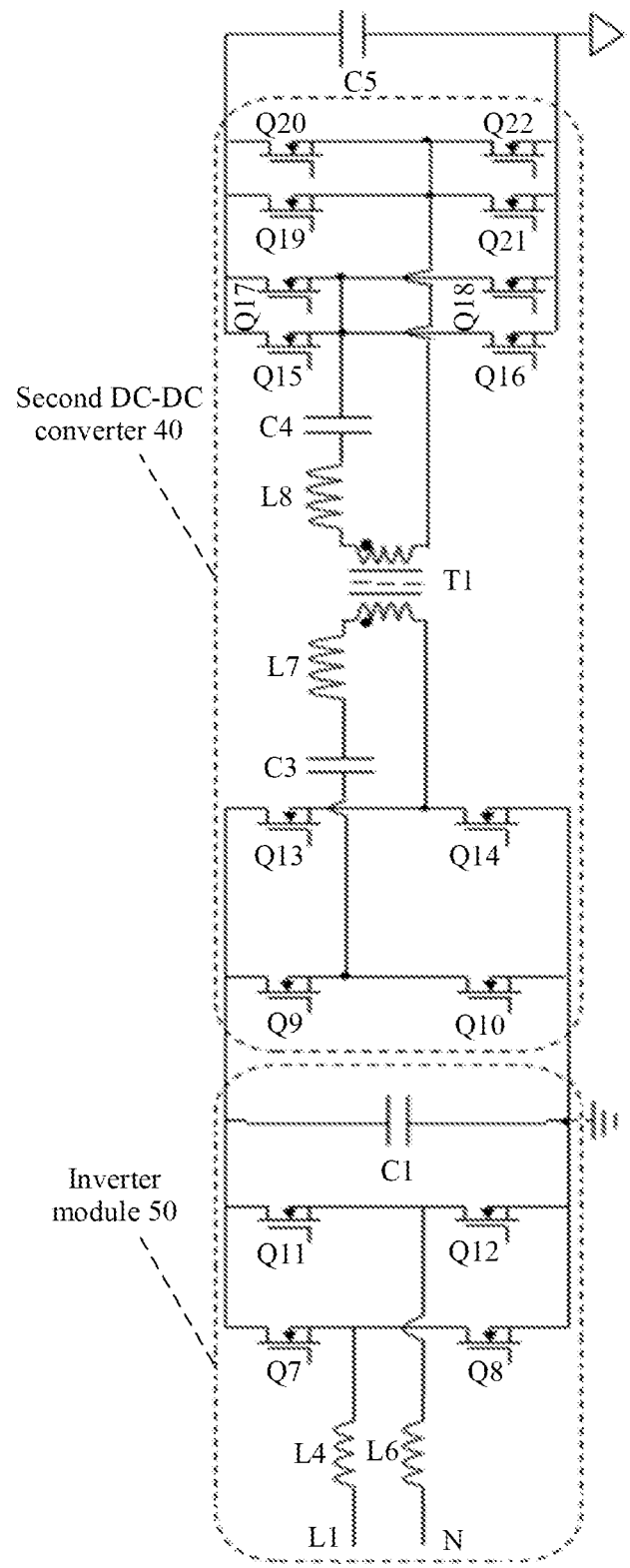
FIG. 15 is a schematic diagram of still another equivalent circuit of a power conversion module according to an embodiment of this application.
Figure 16:
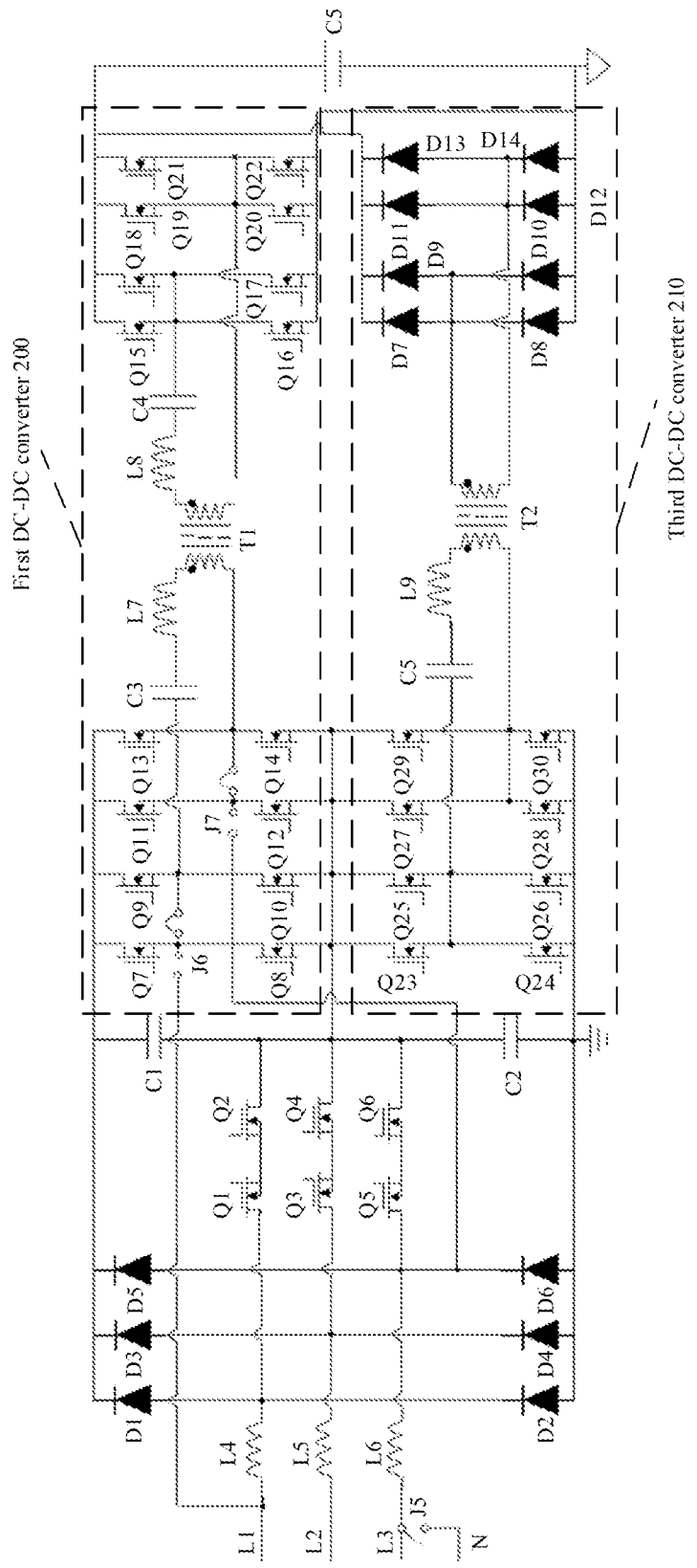
FIG. 16 is still another schematic structural diagram of a power conversion module according to an embodiment of this application.

Specifically, to correspond to FIG. 3, FIG. 6, and FIG. 8, an embodiment of this application further provides FIG. 11, FIG. 14, and FIG. 16, which are three different schematic structural diagrams of a power conversion module when the power conversion module includes both the first DC-DC converter 200 and the third DC-DC converter 210. In each of FIG. 11 to FIG. 17, an example is used for description in which the third DC-DC converter 210 is an LLC circuit. More specifically, because the third primary circuit of the third DC-DC converter 210 is similar to the first primary circuit, for parts and components included in the third DC-DC converter 210 and connection relationships between the parts and components, refer to the description of the first primary circuit, and details are not described herein again. In FIG. 11, FIG. 14, and FIG. 16, the third secondary circuit may include four bridge arms, and each bridge arm may include two diodes. Specifically, the diodes included in the third secondary circuit may be a diode D7, a diode D8, a diode D9, a diode D10, a diode D11, a diode D12, a diode D13, and a diode D14. The diode D7 and the diode D9 are connected in parallel, the diode D8 and the diode D10 are connected in parallel, the diode D11 and the diode D13 are connected in parallel, and the diode D12 and the diode D14 are connected in parallel. More specifically, the diode D7 and the diode D9, and the diode D12 and the diode D14 may be simultaneously conducted or simultaneously cut off; and the diode D8 and the diode D10, and the diode D11 and the diode D13 may be simultaneously conducted or simultaneously cut off. When the diode D7 and the diode D9, and the diode D12 and the diode D14 are conducted, the diode D8 and the diode D10, and the diode D11 and the diode D13 are cut off, and the diode D7 and the diode D9 that are connected in parallel, the diode D12 and the diode D14 that are connected in parallel, and the transformer T2 are connected in series. When the diode D7 and the diode D9, and the diode D12 and the diode D14 are cut off, the diode D8 and the diode D10, and the diode D11 and the diode D13 are conducted, and the diode D8 and the diode D10 that are connected in parallel, the diode D11 and the diode D13 that are connected in parallel, and the transformer T2 are connected in series. It may be understood that although the third secondary circuit in each of FIG. 11, FIG. 14, and FIG. 16 includes four bridge arms, and each bridge arm includes two diodes, in an actual case, the third secondary circuit may alternatively include two bridge arms, six bridge arms, or the like, and each bridge arm may alternatively include four diodes, six diodes, or the like. Examples in FIG. 11, FIG. 14, and FIG. 16 are merely used to facilitate understanding of this solution, and are not used to limit this solution.

Figure 12:
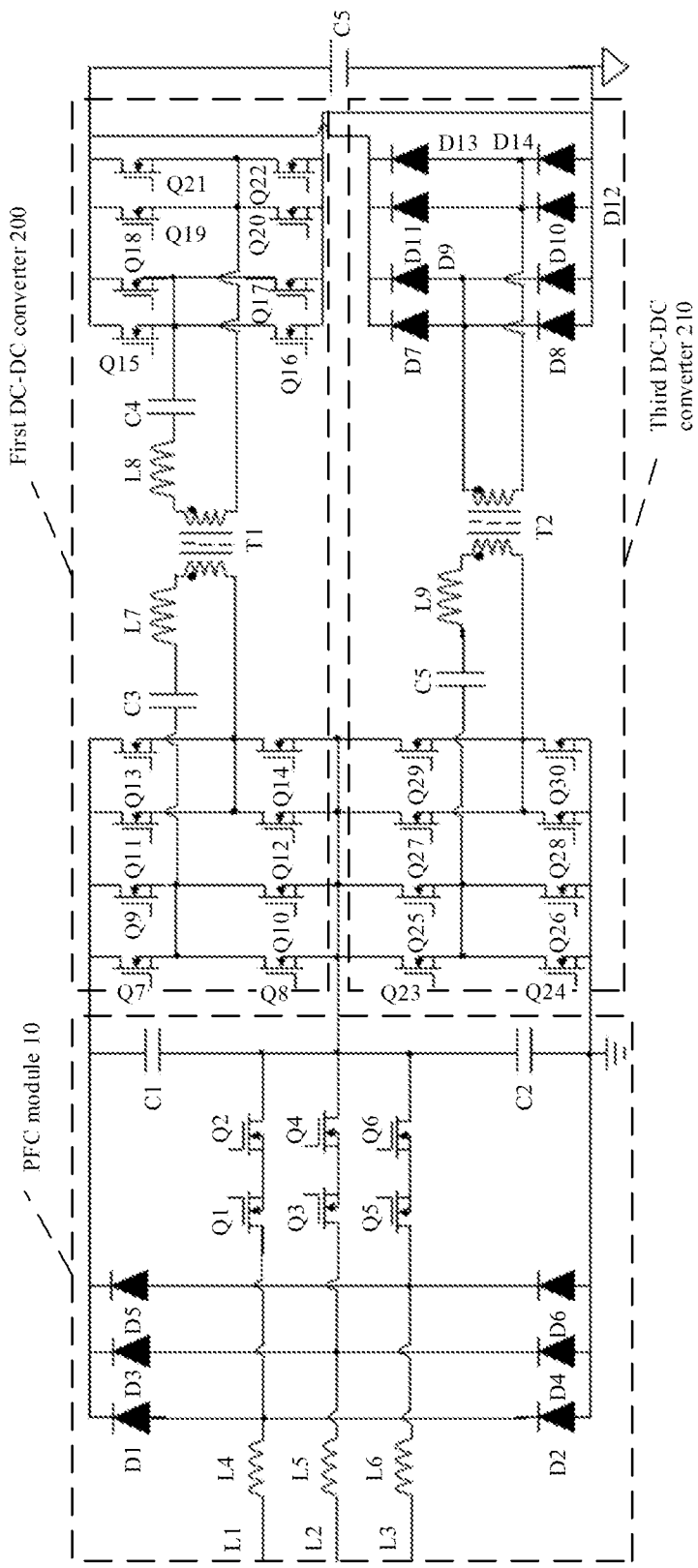
FIG. 12 is a schematic diagram of still another equivalent circuit of a power conversion module according to an embodiment of this application.

Further, FIG. 11 is first described. In FIG. 11, an example is used for description in which a first interface is a live wire interface L1, a second interface is a zero wire interface N, the second interface is coupled to a third bridge arm (that is, a bridge arm including a switching transistor Q11 and a switching transistor Q12 in FIG. 11) by using a fifth switch, one end of the fifth switch is connected to the second interface, and the other end of the fifth switch is connected to a conducting wire between an inductor L6 and a switching transistor Q5. When each of a first transfer switch 31 (that is, a switch J6 in FIG. 11) and a second transfer switch 32 (that is, a switch J7 in FIG. 11) is switched to a contact 2, and the fifth switch (that is, a switch J5 in FIG. 11) is in a turned-off state, that is, when a first switch, a second switch, and the fifth switch are all in a turned-off state, and both a third switch and a fourth switch are in a turned-on state, a PFC module 10, a first DC-DC converter 200, and a third DC-DC converter 210 are configured to perform forward charging. An equivalent circuit diagram of FIG. 11 may be FIG. 12. FIG. 12 is a schematic diagram of still another state of a power conversion module according to an embodiment of this application. A circuit diagram shown in FIG. 12 is similar to a circuit diagram shown in FIG. 4, and a difference lies in that a DC-DC converter in FIG. 4 includes only the first DC-DC converter 200, and among primary circuits of DC-DC converters in FIG. 12, a first primary circuit and a second primary circuit 600 are connected in series, and a first secondary circuit and a second secondary circuit 610 are connected in parallel. Correspondingly, in the circuit diagram shown in FIG. 4, the first DC-DC converter 200 performs isolation conversion on a bus direct current voltage, to output a stable direct current voltage to charge the battery pack C5; and in the circuit diagram shown in FIG. 12, a first DC-DC converter 200 and a third DC-DC converter 210 whose primary circuits are connected in series and whose secondary circuits are connected in parallel perform isolation conversion on a bus direct current voltage, to output a stable direct current voltage to charge a battery pack C5. A specific implementation principle in the circuit diagram shown in FIG. 12 is similar to an implementation principle in the circuit diagram shown in FIG. 4. Therefore, details are not described herein again.

When each of the first transfer switch 31 and the second transfer switch 32 is switched to a contact 1, and the fifth switch is in a turned-on state, that is, when the first switch, the second switch, and the fifth switch are all in a turned-on state, and both the third switch and the fourth switch are in a turned-off state, an equivalent circuit diagram of FIG. 11 may be FIG. 13. A circuit diagram shown in FIG. 13 is similar to a circuit diagram shown in FIG. 5, and a difference only lies in that the bus capacitors in FIG. 5 include the capacitor C1 and the capacitor C2, but a bus capacitor in FIG. 13 includes only a capacitor C1. For a specific implementation principle in FIG. 13, refer to the foregoing description of an implementation principle in FIG. 5, and details are not described herein again.

Second, FIG. 14 is described. In FIG. 14, an example is used for description in which a first interface is a live wire interface L1, a second interface is a zero wire interface N, the second interface is coupled to a third bridge arm (that is, a bridge arm including a switching transistor Q11 and a switching transistor Q12 in FIG. 14) by using a fifth switch, one end of the fifth switch is connected to the second interface, and the other end of the fifth switch is connected to a conducting wire between a third interface (that is, a live wire interface L3 in FIG. 14) and a second inductor 106 (that is, an inductor L6 in FIG. 14). When each of a first transfer switch 31 (that is, a switch J6 in FIG. 14) and a second transfer switch 32 (that is, a switch J7 in FIG. 14) is switched to a contact 2, and the fifth switch (that is, a switch J5 in FIG. 14) is in a turned-off state, an equivalent circuit diagram of FIG. 14 may be FIG. 12, and details are not described herein again. When each of the first transfer switch 31 and the second transfer switch 32 is switched to a contact 1, and the fifth switch is in a turned-on state, an equivalent circuit diagram of FIG. 14 is FIG. 15. A circuit diagram shown in FIG. 15 is similar to a circuit diagram shown in FIG. 7, and a difference also only lies in that the bus capacitors in FIG. 7 include the capacitor C1 and the capacitor C2, but a bus capacitor in FIG. 15 includes only a capacitor C1. For a specific implementation principle in FIG. 15, refer to the foregoing description of an implementation principle in FIG. 7, and details are not described herein again.

Figure 17:
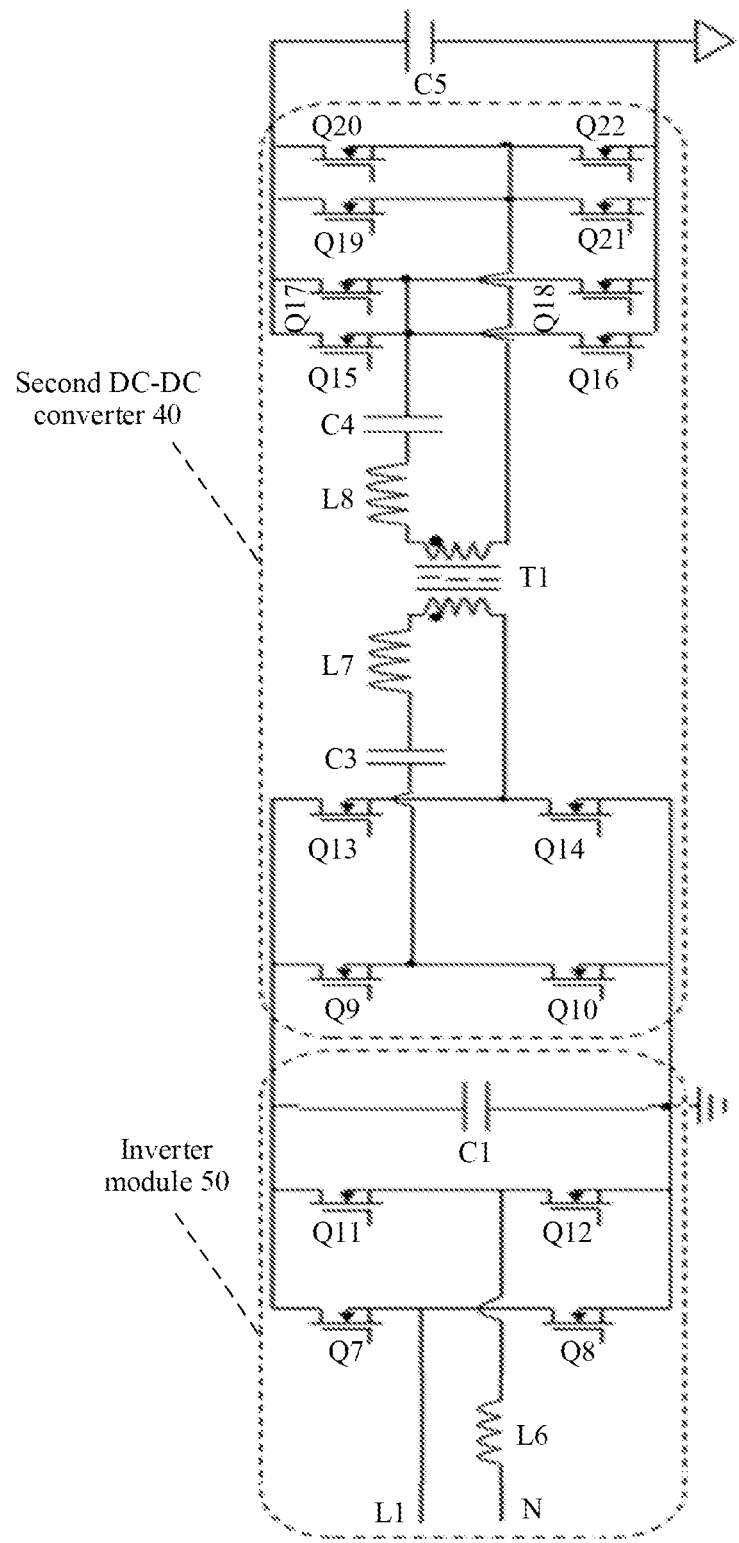
FIG. 17 is a schematic diagram of still another equivalent circuit of a power conversion module according to an embodiment of this application.

Third, FIG. 16 is described. In FIG. 16, an example is used for description in which a first interface is a zero wire interface N, a second interface is a live wire interface L1, the first interface is coupled to a first bridge arm (that is, a bridge arm including a switching transistor Q11 and a switching transistor Q12 in FIG. 16) by using a fifth switch, one end of the fifth switch is connected to the first interface, the other end of the fifth switch is connected to a conducting wire between a third interface (that is, a live wire interface L3 in FIG. 16) and a first inductor (that is, an inductor L6 in FIG. 16), and a second switch (that is, a switch J1 in FIG. 16) is directly connected to the second interface. When each of a first transfer switch 31 (that is, a switch J7 in FIG. 16) and a second transfer switch 32 (that is, a switch J6 in FIG. 16) is switched to a contact 2, and the fifth switch (that is, a switch J5 in FIG. 16) is in a turned-off state, an equivalent circuit diagram of FIG. 16 may be FIG. 12, and details are not described herein again. When each of the first transfer switch 31 and the second transfer switch 32 is switched to a contact 1, and the fifth switch is in a turned-on state, an equivalent circuit diagram of FIG. 16 is FIG. 17. A circuit diagram shown in FIG. 17 is similar to a circuit diagram shown in FIG. 9, and a difference also only lies in that the bus capacitors in FIG. 9 include the capacitor C1 and the capacitor C2, but a bus capacitor in FIG. 17 includes only a capacitor C1. For a specific implementation principle in FIG. 17, refer to the foregoing description of an implementation principle in FIG. 9, and details are not described herein again.

It should be noted that in each of FIG. 11 to FIG. 17, an example is used for description in which the first switch and the third switch are embodied as the same first transfer switch 31, and the second switch and the fourth switch are embodied as the same second transfer switch 32. For a case in which each of the first switch, the second switch, the third switch, and the fourth switch is embodied as an independent switch, a switch may be directly replaced and applied. Herein, details are not described again for the case in which each of the first switch, the second switch, the third switch, and the fourth switch is embodied as an independent switch.

Optionally, in circuit diagrams shown in FIG. 6 and FIG. 14, each of PFC modules 10 includes three branch circuits. The three branch circuits may include a first branch circuit and a second branch circuit, where a first interface is an input interface of the first branch circuit, and a third interface is an input interface of the second branch circuit. When both a first switch and a second switch are in a turned-off state and a fifth switch is in a turned-on state, a second interface can bypass the third interface and is connected to the second branch circuit, to form a single-phase rectifier circuit 60. The single-phase rectifier circuit 60 includes the first branch circuit, a third branch circuit, and bus capacitors, where the third branch circuit includes the second interface and a component other than the third interface in the second branch circuit. In this embodiment of this application, when the PFC module 10 includes a three-phase rectifier circuit, in a case in which the first switch and the second switch are turned off, and a third switch, a fourth switch, and the fifth switch are turned on, the single-phase rectifier circuit 60 may be formed. That is, the existing three-phase rectifier circuit is utilized to implement a function of the single-phase rectifier circuit 60. In this way, a power conversion module provided in this embodiment of this application can implement both three-phase input and single-phase input, thereby expanding an application scenario of this solution and improving comprehensiveness of this solution.

Specifically, in each of FIG. 6 and FIG. 14, an example is used for description in which the first interface is a live wire interface L1, the second interface is a zero wire interface N, and the third interface is a live wire interface L3. Correspondingly, the first branch circuit may include the live wire interface L1, an inductor L4, a diode D1, a diode D2, a switching transistor Q1, and a switching transistor Q2; and the second branch circuit may include the live wire interface L3, an inductor L6, a diode D5, a diode D6, a switching transistor Q5, and a switching transistor Q6. Because specific implementations of the components in the first branch circuit and the second branch circuit and connection relationships between the components are described in detail in the foregoing description of FIG. 3, details are not described herein again.

Figure 18:
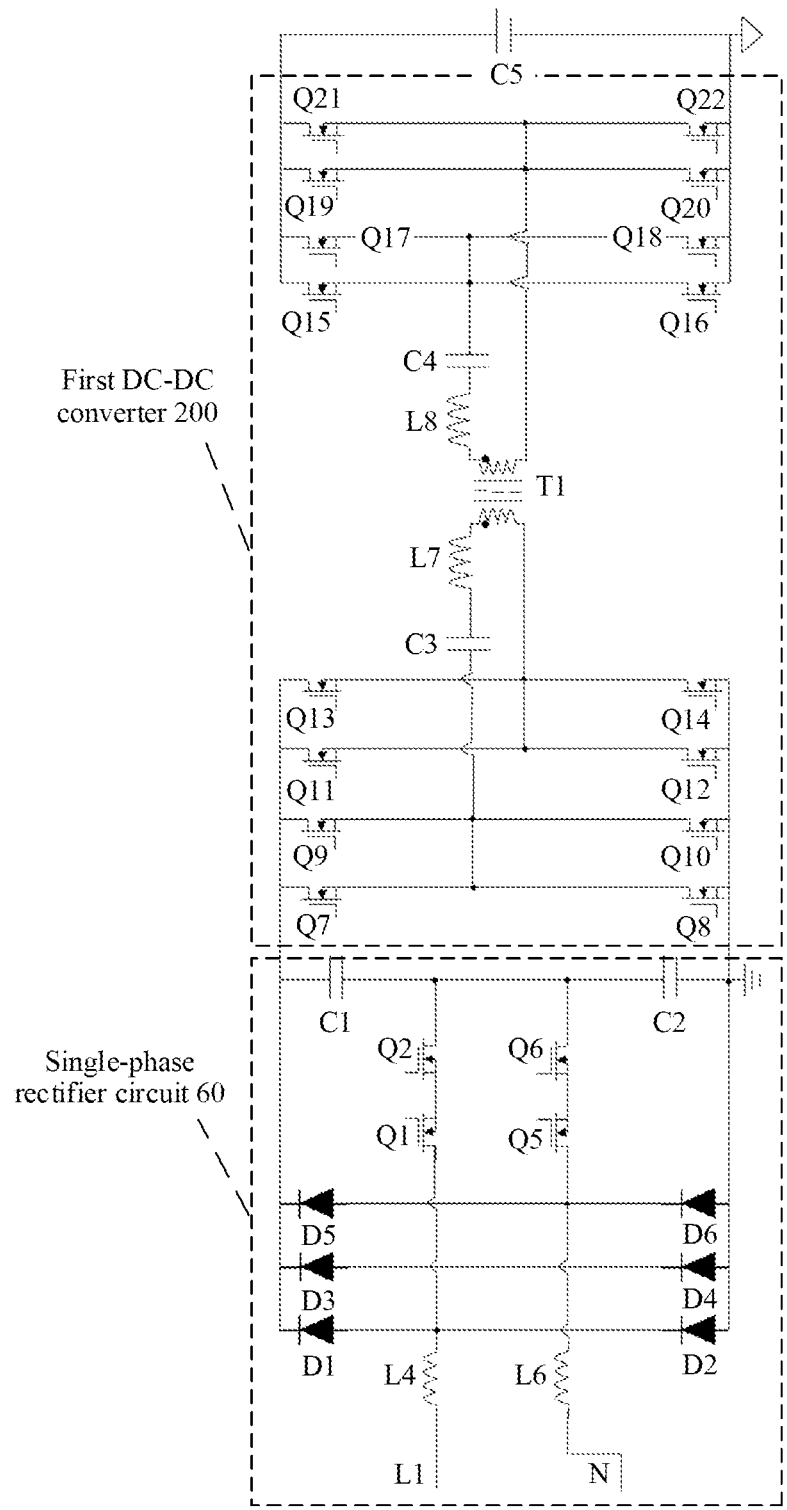
FIG. 18 is a schematic diagram of still another equivalent circuit of a power conversion module according to an embodiment of this application.

In one case, for the circuit diagram shown in FIG. 6, when the first switch and the second switch are in a turned-off state, and the fifth switch is in a turned-on state, an equivalent circuit diagram of FIG. 6 may be FIG. 18. FIG. 18 is a schematic diagram of a state of a power conversion module according to an embodiment of this application. As shown in FIG. 18, when a fifth switch 25 is in a turned-on state, a second interface (that is, the zero wire interface N in FIG. 6 or a zero wire interface N in FIG. 18) can bypass a third interface (that is, the live wire interface L3 in FIG. 6) and be connected to a second branch circuit, to form a third branch circuit. The third branch circuit may include the second interface and a component other than the third interface in the second branch circuit. To be specific, the third branch circuit may include the zero wire interface N, an inductor L6, a diode D5, a diode D6, a switching transistor Q5, and a diode Q6, to further form a single-phase rectifier circuit 60. More specifically, a diode D1 and the diode D6 are simultaneously conducted or simultaneously cut off, and a diode D2 and the diode D5 are simultaneously conducted or simultaneously cut off. When the switching transistor Q1, the switching transistor Q2, a switching transistor Q3, and a switching transistor Q4 are turned on, the first interface (that is, the live wire interface L1 in FIG. 6 and a live wire interface L1 in FIG. 18), the inductor L4, the switching transistor Q1, the switching transistor Q2, the switching transistor Q3, the switching transistor Q4, the inductor L6, and the second interface are connected in series; when the switching transistor Q1, the switching transistor Q2, a switching transistor Q3, and a switching transistor Q4 are turned off, and the diode D1 and the diode D6 are conducted, the diode D2 and the diode D5 are cut off, and the first interface, the inductor L4, the diode D1, bus capacitors (that is, a capacitor C1 and a capacitor C2 in FIG. 18), the diode D6, the inductor L6, and the second interface are connected in series; or when the switching transistor Q1, the switching transistor Q2, a switching transistor Q3, and a switching transistor Q4 are turned off, and the diode D1 and the diode D6 are cut off, the diode D2 and the diode D5 are conducted, and the first interface, the inductor L4, the diode D2, the bus capacitors, the diode D5, the inductor L6, and the second interface are connected in series. In the foregoing manner, the single-phase rectifier circuit 60 may convert an input alternating current into a bus direct current voltage, and further a first DC-DC converter 200 converts the bus direct current voltage into a high-voltage direct current voltage, and then charges a battery pack C5. Because the first DC-DC converter 200 is described in detail in the foregoing description of FIG. 3, details are not described herein again. It should be noted that when the power conversion module provided in this embodiment of this application performs charging by using the single-phase rectifier circuit 60, the zero wire interface N is not directly connected to a bus.

Figure 19:
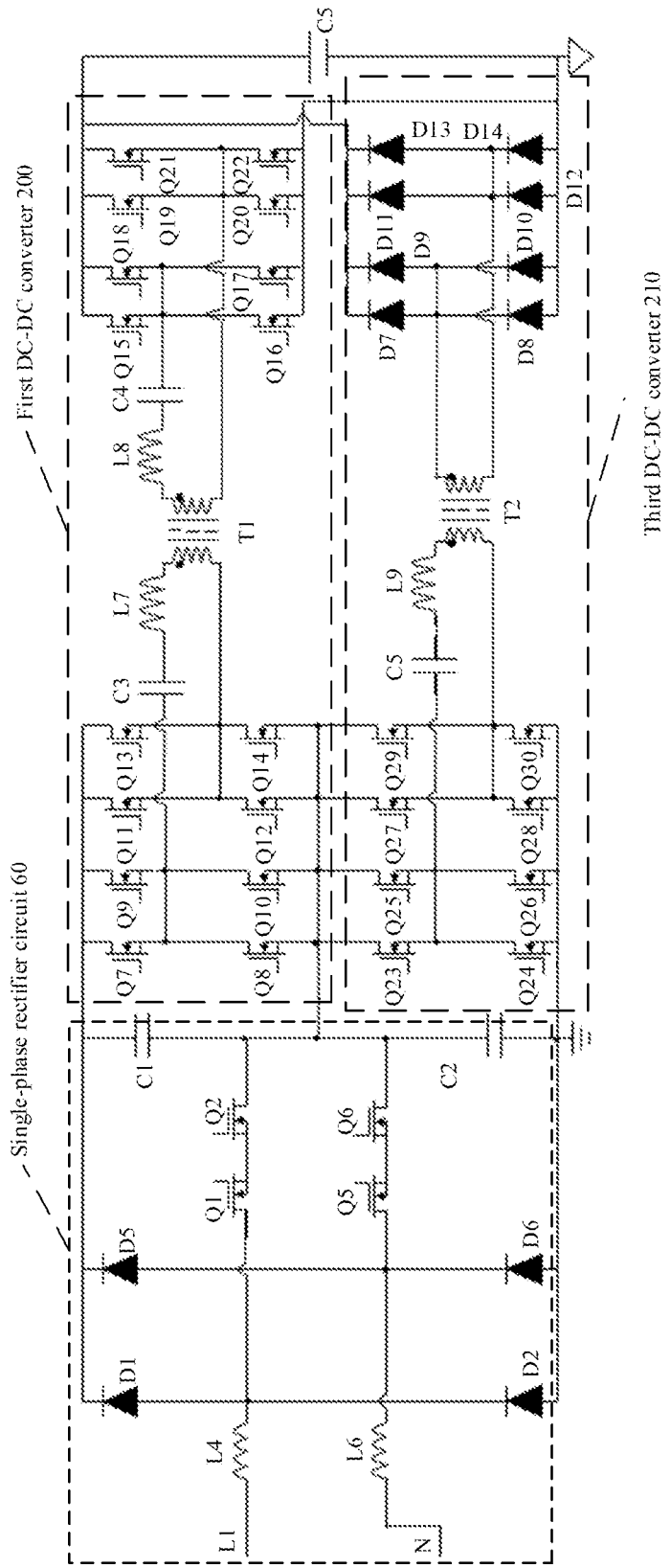
FIG. 19 is a schematic diagram of still another equivalent circuit of a power conversion module according to an embodiment of this application.

In another case, for the circuit diagram shown in FIG. 14, when the first switch and the second switch are in a turned-off state, and the fifth switch is in a turned-on state, an equivalent circuit diagram of FIG. 14 may be FIG. 19. Connection relationships between components included in a single-phase rectifier circuit 60 in a circuit shown in FIG. 19 are similar to connection relationships between the components included in the single-phase rectifier circuit 60 in a circuit shown in FIG. 18, and working principles of the circuit shown in FIG. 19 are similar to working principles of the circuit shown in FIG. 18. Therefore, refer to the foregoing description of the single-phase rectifier circuit 60 in FIG. 18 to understand the single-phase rectifier circuit 60 shown in FIG. 19, and details are not described herein again. As shown in FIG. 19, after the single-phase rectifier circuit 60 converts an input alternating current into a bus direct current voltage, a first DC-DC converter 200 and a third DC-DC converter 210 may convert the bus direct current voltage into a high-voltage direct current voltage, to charge a battery pack C5. Because the first DC-DC converter 200 and the third DC-DC converter 210 are described in detail in the foregoing description of FIG. 11, details are not described herein again.

An embodiment of this application further provides a vehicle-mounted charger. The vehicle-mounted charger includes an EMI filter module 1 and a power conversion module 2. The power conversion module 2 includes a PFC module 10 and a DC-DC converter 20. The DC-DC converter 20 may include a first DC-DC converter 200. The PFC module has a first interface, a second interface, and a bus capacitor, and a first inductor is connected to the first interface. The first DC-DC converter 200 includes a first primary circuit and a first secondary circuit, and the first primary circuit includes a first bridge arm, a second bridge arm, a third bridge arm, and a fourth bridge arm. The power conversion module 2 further includes a first switch, a second switch, a third switch, and a fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. When both the first switch and the second switch are in a turned-off state and both the third switch and the fourth switch are in a turned-on state, the EMI filter module 1, the PFC module 10, and the first DC-DC converter 200 are configured to perform forward charging. When both the first switch and the second switch are in a turned-on state and both the third switch and the fourth switch are in a turned-off state, the first bridge arm is coupled to the first inductor, and the third bridge arm is coupled to the second interface, to form a second DC-DC converter 40 and an inverter module 50. A second primary circuit of the second DC-DC converter 40 is the first secondary circuit of the first DC-DC converter 200, a second secondary circuit of the second DC-DC converter 40 includes the second bridge arm and the fourth bridge arm, and the inverter module 50 includes the first bridge arm, the third bridge arm, the first inductor, and the bus capacitor.

In a possible implementation, each of the first bridge arm, the second bridge arm, the third bridge arm, and the fourth bridge arm includes two switching transistors. One end of the first switch is connected between two switching transistors of the first bridge arm, and the other end of the first switch is coupled to the first inductor. One end of the second switch is connected between two switching transistors of the third bridge arm, and the other end of the second switch is coupled to the second interface. One end of the third switch is connected between the two switching transistors of the first bridge arm, and the other end of the third switch is connected between two switching transistors of the second bridge arm. One end of the fourth switch is connected between the two switching transistors of the third bridge arm, and the other end of the fourth switch is connected between two switching transistors of the fourth bridge arm.

In a possible implementation, the first switch and the third switch are a same first transfer switch 31, and the second switch and the fourth switch are a same second transfer switch 32.

In a possible implementation, the PFC module includes a three-phase rectifier circuit. The three-phase rectifier circuit includes three live wire interfaces and a zero wire interface. The first interface is any one of the three live wire interfaces, the second interface is the zero wire interface, and the three live wire interfaces further include a third interface, where the third interface is any one of the three live wire interfaces except the first interface. The power conversion module 2 further includes a fifth switch, where one end of the fifth switch is connected to the second interface, and the other end of the fifth switch is coupled to the second switch. When the first switch, the second switch, and the fifth switch are all in a turned-on state, the second interface bypasses the third interface and is coupled to the third bridge arm.

In a possible implementation, the three-phase rectifier circuit includes a first branch circuit and a second branch circuit, where the first interface is an input interface of the first branch circuit, and the third interface is an input interface of the second branch circuit. When the third switch, the fourth switch, and the fifth switch are all in a turned-on state, the second interface bypasses the third interface and is connected to the second branch circuit, to form a single-phase rectifier circuit 60. The single-phase rectifier circuit 60 includes the first branch circuit, a third branch circuit, and the bus capacitor, where the third branch circuit includes the second interface and a component other than the third interface in the second branch tributary 108.

In a possible implementation, a second inductor 106 is connected to the third interface, one end of the fifth switch is connected to the second interface, and the other end of the fifth switch is connected between the third interface and the second inductor 106.

In a possible implementation, the PFC module is a Vienna rectifier circuit, and the first DC-DC converter is a CLLC circuit. The power conversion module 2 further includes a third DC-DC converter 210, where the third DC-DC converter 210 is an LLC circuit, and the third DC-DC converter 210 includes a third primary circuit and a third secondary circuit. The third primary circuit is connected to the first primary circuit in series, and the third secondary circuit is connected to the first secondary circuit in parallel.

In a possible implementation, all switching transistors in the first bridge arm, the second bridge arm, the third bridge arm, and the fourth bridge arm are MOS transistors, triodes, SiC transistors, or IGBTs.

For all of shapes, quantities, locations, specific implementations, and beneficial effects of electronic parts and components included in the vehicle-mounted charger provided in this embodiment of this application, refer to specific descriptions in the embodiments corresponding to FIG. 2 to FIG. 19, and details are not described herein again.

An embodiment of this application further provides an electric vehicle. The electric vehicle includes a vehicle-mounted charger and a battery pack. The vehicle-mounted charger includes an EMI filter module 1 and a power conversion module 2. The power conversion module 2 includes a PFC module 10 and a DC-DC converter 20. The DC-DC converter 20 may include a first DC-DC converter 200. The PFC module has a first interface, a second interface, and a bus capacitor, and a first inductor is connected to the first interface. The first DC-DC converter 200 includes a first primary circuit and a first secondary circuit, and the first primary circuit includes a first bridge arm, a second bridge arm, a third bridge arm, and a fourth bridge arm. The power conversion module 2 further includes a first switch, a second switch, a third switch, and a fourth switch, where the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm. When both the first switch and the second switch are in a turned-off state and both the third switch and the fourth switch are in a turned-on state, the EMI filter module 1, the PFC module 10, and the first DC-DC converter 200 are configured to perform forward charging. When both the first switch and the second switch are in a turned-on state and both the third switch and the fourth switch are in a turned-off state, the first bridge arm is coupled to the first inductor, and the third bridge arm is coupled to the second interface, to form a second DC-DC converter 40 and an inverter module 50. A second primary circuit of the second DC-DC converter 40 is the first secondary circuit of the first DC-DC converter 200, a second secondary circuit of the second DC-DC converter 40 includes the second bridge arm and the fourth bridge arm, and the inverter module 50 includes the first bridge arm, the third bridge arm, the first inductor, and the bus capacitor. The battery pack is configured to store power input by the vehicle-mounted charger, and is further configured to perform inverse discharging by using the vehicle-mounted charger.

In a possible implementation, each of the first bridge arm, the second bridge arm, the third bridge arm, and the fourth bridge arm includes two switching transistors. One end of the first switch is connected between two switching transistors of the first bridge arm, and the other end of the first switch is coupled to the first inductor. One end of the second switch is connected between two switching transistors of the third bridge arm, and the other end of the second switch is coupled to the second interface. One end of the third switch is connected between the two switching transistors of the first bridge arm, and the other end of the third switch is connected between two switching transistors of the second bridge arm. One end of the fourth switch is connected between the two switching transistors of the third bridge arm, and the other end of the fourth switch is connected between two switching transistors of the fourth bridge arm.

In a possible implementation, the first switch and the third switch are a same first transfer switch 31, and the second switch and the fourth switch are a same second transfer switch 32.

In a possible implementation, the PFC module includes a three-phase rectifier circuit. The three-phase rectifier circuit includes three live wire interfaces and a zero wire interface. The first interface is any one of the three live wire interfaces, the second interface is the zero wire interface, and the three live wire interfaces further include a third interface, where the third interface is any one of the three live wire interfaces except the first interface. The power conversion module 2 further includes a fifth switch, where one end of the fifth switch is connected to the second interface, and the other end of the fifth switch is coupled to the second switch. When the first switch, the second switch, and the fifth switch are all in a turned-on state, the second interface bypasses the third interface and is coupled to the third bridge arm.

In a possible implementation, the three-phase rectifier circuit includes a first branch circuit and a second branch circuit, where the first interface is an input interface of the first branch circuit, and the third interface is an input interface of the second branch circuit. When the third switch, the fourth switch, and the fifth switch are all in a turned-on state, the second interface bypasses the third interface and is connected to the second branch circuit, to form a single-phase rectifier circuit 60. The single-phase rectifier circuit 60 includes the first branch circuit, a third branch circuit, and the bus capacitor, where the third branch circuit includes the second interface and a component other than the third interface in the second branch tributary 108.

In a possible implementation, a second inductor 106 is connected to the third interface, one end of the fifth switch is connected to the second interface, and the other end of the fifth switch is connected between the third interface and the second inductor 106.

In a possible implementation, the PFC module is a Vienna rectifier circuit, and the first DC-DC converter is a CLLC circuit. The power conversion module 2 further includes a third DC-DC converter 210, where the third DC-DC converter 210 is an LLC circuit, and the third DC-DC converter 210 includes a third primary circuit and a third secondary circuit. The third primary circuit is connected to the first primary circuit in series, and the third secondary circuit is connected to the first secondary circuit in parallel.

In a possible implementation, all switching transistors in the first bridge arm, the second bridge arm, the third bridge arm, and the fourth bridge arm are MOS transistors, triodes, SiC transistors, or IGBTs.

For shapes, quantities, locations, specific implementations, and beneficial effects of electronic parts and components included in the electric vehicle provided in this embodiment of this application, refer to specific descriptions in the embodiments corresponding to FIG. 1 to FIG. 19, and details are not described herein again.

In the several embodiments provided in this application, it should be understood that the disclosed apparatus and device may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

What is claimed is:

1. A power conversion module, wherein the power conversion module comprises a power factor correction (PFC) module and a first direct current-direct current (DC-DC) converter, wherein the PFC module has a first interface, a second interface, and a bus capacitor, and a first inductor is connected to the first interface; and the first DC-DC converter comprises a first primary circuit and a first secondary circuit, and the first primary circuit comprises a first bridge arm, a second bridge arm, a third bridge arm, and a fourth bridge arm; the power conversion module further comprises a first switch, a second switch, a third switch, and a fourth switch, wherein the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm;

wherein when both the first switch and the second switch are in a turned-off state and both the third switch and the fourth switch are in a turned-on state, the PFC module and the first DC-DC converter are configured to perform forward charging;

when both the first switch and the second switch are in a turned-on state and both the third switch and the fourth switch are in turned-off state, the first bridge arm is coupled to the first inductor, and the third bridge arm is coupled to the second interface, to form a second DC-DC converter and an inverter module; and a second primary circuit of the second DC-DC converter is the first secondary circuit of the first DC-DC converter, a second secondary circuit of the second DC-DC converter comprises the second bridge arm and the fourth bridge arm, and the inverter module comprises the first bridge arm, the third bridge arm, the first inductor, and the bus capacitor.

2. The power conversion module according to claim 1, wherein each of the first bridge arm, the second bridge arm, the third bridge arm, and the fourth bridge arm comprise two switching transistors;
one end of the first switch is connected between two switching transistors of the first bridge arm, and the other end of the first switch is coupled to the first inductor;
one end of the second switch is connected between two switching transistors of the third bridge arm, and the other end of the second switch is coupled to the second interface;
one end of the third switch is connected between the two switching transistors of the first bridge arm, and the other end of the third switch is connected between two switching transistors of the second bridge arm; and
one end of the fourth switch is connected between the two switching transistors of the third bridge arm, and the other end of the fourth switch is connected between two switching transistors of the fourth bridge arm.

3. The power conversion module according to claim 1, wherein the first switch and the third switch are a same first transfer switch, and the second switch and the fourth switch are a same second transfer switch.

4. The power conversion module according to claim 1, wherein the PFC module comprises a three-phase rectifier circuit, the three-phase rectifier circuit comprises three live wire interfaces and a zero wire interface, the first interface is any one of the three live wire interfaces, the second interface is the zero wire interface, and the three live wire interfaces further comprise a third interface, wherein the third interface is any one of the three live wire interfaces except the first interface;
the power conversion module further comprises a fifth switch, wherein one end of the fifth switch is connected to the second interface, and the other end of the fifth switch is coupled to the second switch; and
when the first switch, the second switch, and the fifth switch are all in a turned-on state, the second interface bypasses the third interface and is coupled to the third bridge arm.

5. The power conversion module according to claim 4, wherein the three-phase rectifier circuit comprises a first branch circuit and a second branch circuit, the first interface is an input interface of the first branch circuit, and the third interface is an input interface of the second branch circuit; and
when the third switch, the fourth switch, and the fifth switch are all in a turned-on state, the second interface bypasses the third interface and is connected to the second branch circuit, to form a single-phase rectifier circuit, wherein
the single-phase rectifier circuit comprises the first branch circuit, a third branch circuit, and the bus capacitor, and the third branch circuit comprises the second interface and a component other than the third interface in the second branch circuit.

6. The power conversion module according to claim 4, wherein a second inductor is connected to the third interface, one end of the fifth switch is connected to the second interface, and the other end of the fifth switch is connected between the third interface and the second inductor.

7. The power conversion module according to claim 1, wherein
the PFC module is a Vienna rectifier circuit, and the first DC-DC converter is a bidirectional resonant conversion CLLC circuit;
the power conversion module further comprises a third DC-DC converter, wherein the third DC-DC converter is a resonant conversion LLC circuit, and the third DC-DC converter comprises a third primary circuit and a third secondary circuit; and
the third primary circuit is connected to the first primary circuit in series, and the third secondary circuit is connected to the first secondary circuit in parallel.

8. The power conversion module according to claim 1, wherein all switching transistors in the first bridge arm, the second bridge arm, the third bridge arm, and the fourth bridge arm are metal-oxide-semiconductor field-effect MOS transistors, triodes, silicon carbide SiC transistors, or insulated gate bipolar transistors IGBTs.

9. A vehicle-mounted charger, wherein the vehicle-mounted charger comprises an electromagnetic compatibility EMI filter module, a power factor correction (PFC) module, and a first direct current-direct current (DC-DC) converter, wherein
the PFC module has a first interface, a second interface, and a bus capacitor, and a first inductor is connected to the first interface; and
the first DC-DC converter comprises a first primary circuit and a first secondary circuit, and the first primary circuit comprises a first bridge arm, a second bridge arm, a third bridge arm, and a fourth bridge arm;
a power conversion module further comprises a first switch, a second switch, a third switch, and a fourth switch, wherein the first switch is disposed between the first bridge arm and the first inductor, the second switch is disposed between the third bridge arm and the second interface, the third switch is disposed between the first bridge arm and the second bridge arm, and the fourth switch is disposed between the third bridge arm and the fourth bridge arm;
wherein when both the first switch and the second switch are in turned-off state and both the third switch and the fourth switch are in a turned-on state, the EMI filter module, the PFC module, and the first DC-DC converter are configured to perform forward charging;
when both the first switch and the second switch are in a turned-on state and both the third switch and the fourth switch are in turned-off state, the first bridge arm is coupled to the first inductor, and the third bridge arm is coupled to the second interface, to form a second DC-DC converter and an inverter module; and a second primary circuit of the second DC-DC converter is the first secondary circuit of the first DC-DC converter, a second secondary circuit of the second DC-DC converter comprises the second bridge arm and the fourth bridge arm, and the inverter module comprises the first bridge arm, the third bridge arm, the first inductor, and the bus capacitor.

10. The vehicle-mounted charger according to claim 9, wherein each of the first bridge arm, the second bridge arm, the third bridge arm, and the fourth bridge arm comprise two switching transistors;

one end of the first switch is connected between two switching transistors of the first bridge arm, and the other end of the first switch is coupled to the first inductor;

one end of the second switch is connected between two switching transistors of the third bridge arm, and the other end of the second switch is coupled to the second interface;

one end of the third switch is connected between the two switching transistors of the first bridge arm, and the other end of the third switch is connected between two switching transistors of the second bridge arm; and one end of the fourth switch is connected between the two switching transistors of the third bridge arm, and the other end of the fourth switch is connected between two switching transistors of the fourth bridge arm.

11. The vehicle-mounted charger according to claim 9, wherein the first switch and the third switch are a same first transfer switch, and the second switch and the fourth switch are a same second transfer switch.

12. The vehicle-mounted charger according to claim 9, wherein the PFC module comprises a three-phase rectifier circuit, the three-phase rectifier circuit comprises three live wire interfaces and a zero wire interface, the first interface is any one of the three live wire interfaces, the second interface is the zero wire interface, and the three live wire interfaces further comprise a third interface, wherein the third interface is any one of the three live wire interfaces except the first interface;

the power conversion module further comprises a fifth switch, wherein one end of the fifth switch is connected to the second interface, and the other end of the fifth switch is coupled to the second switch; and when the first switch, the second switch, and the fifth switch are all in a turned-on state, the second interface bypasses the third interface and is coupled to the third bridge arm.

13. The vehicle-mounted charger according to claim 12, wherein the three-phase rectifier circuit comprises a first branch circuit and a second branch circuit, the first interface is an input interface of the first branch circuit, and the third interface is an input interface of the second branch circuit; and when the third switch, the fourth switch, and the fifth switch are all in a turned-on state, the second interface bypasses the third interface and is connected to the second branch circuit, to form a single-phase rectifier circuit, wherein the single-phase rectifier circuit comprises the first branch circuit, a third branch circuit, and the bus capacitor, and the third branch circuit comprises the second interface and a component other than the third interface in the second branch circuit.

14. The vehicle-mounted charger according to claim 12, wherein a second inductor is connected to the third interface, one end of the fifth switch is connected to the second interface, and the other end of the fifth switch is connected between the third interface and the second inductor.

15. The vehicle-mounted charger according to claim 9, wherein the PFC module is a Vienna rectifier circuit, and the first DC-DC converter is a bidirectional resonant conversion CLLC circuit;

the power conversion module further comprises a third DC-DC converter, wherein the third DC-DC converter is a resonant conversion LLC circuit, and the third DC-DC converter comprises a third primary circuit and a third secondary circuit; and the third primary circuit is connected to the first primary circuit in series, and the third secondary circuit is connected to the first secondary circuit in parallel.

16. The vehicle-mounted charger according to claim 9, wherein all switching transistors in the first bridge arm, the second bridge arm, the third bridge arm, and the fourth bridge arm are metal-oxide-semiconductor field-effect MOS transistors, triodes, silicon carbide SiC transistors, or insulated gate bipolar transistors IGBTs.

17. An electric vehicle, wherein the electric vehicle comprises a vehicle-mounted charger and a battery pack, wherein the vehicle-mounted charger is the vehicle-mounted charger according to claim 9; and the battery pack is configured to store power input by the vehicle-mounted charger, and is further configured to perform inverse discharging by using the vehicle-mounted charger.

* * * * *